April 21, 1964     E. C. SLOAN ETAL     3,129,545
PACKAGE FORMING APPARATUS AND COMPONENTS THEREOF
Filed Oct. 11, 1960     13 Sheets-Sheet 1
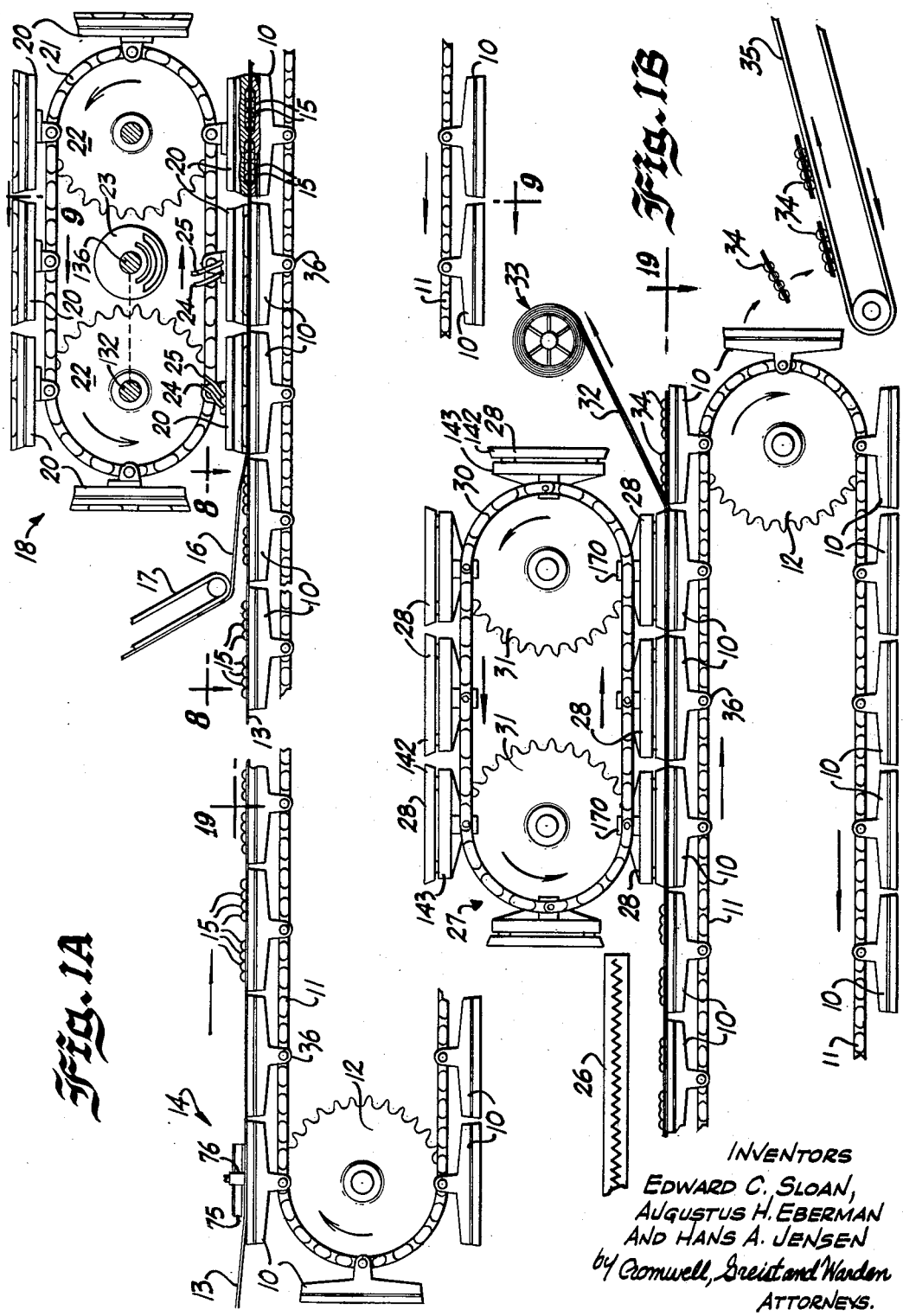
INVENTORS
EDWARD C. SLOAN,
AUGUSTUS H. EBERMAN
AND HANS A. JENSEN
by Cromwell, Greist and Warden
ATTORNEYS.

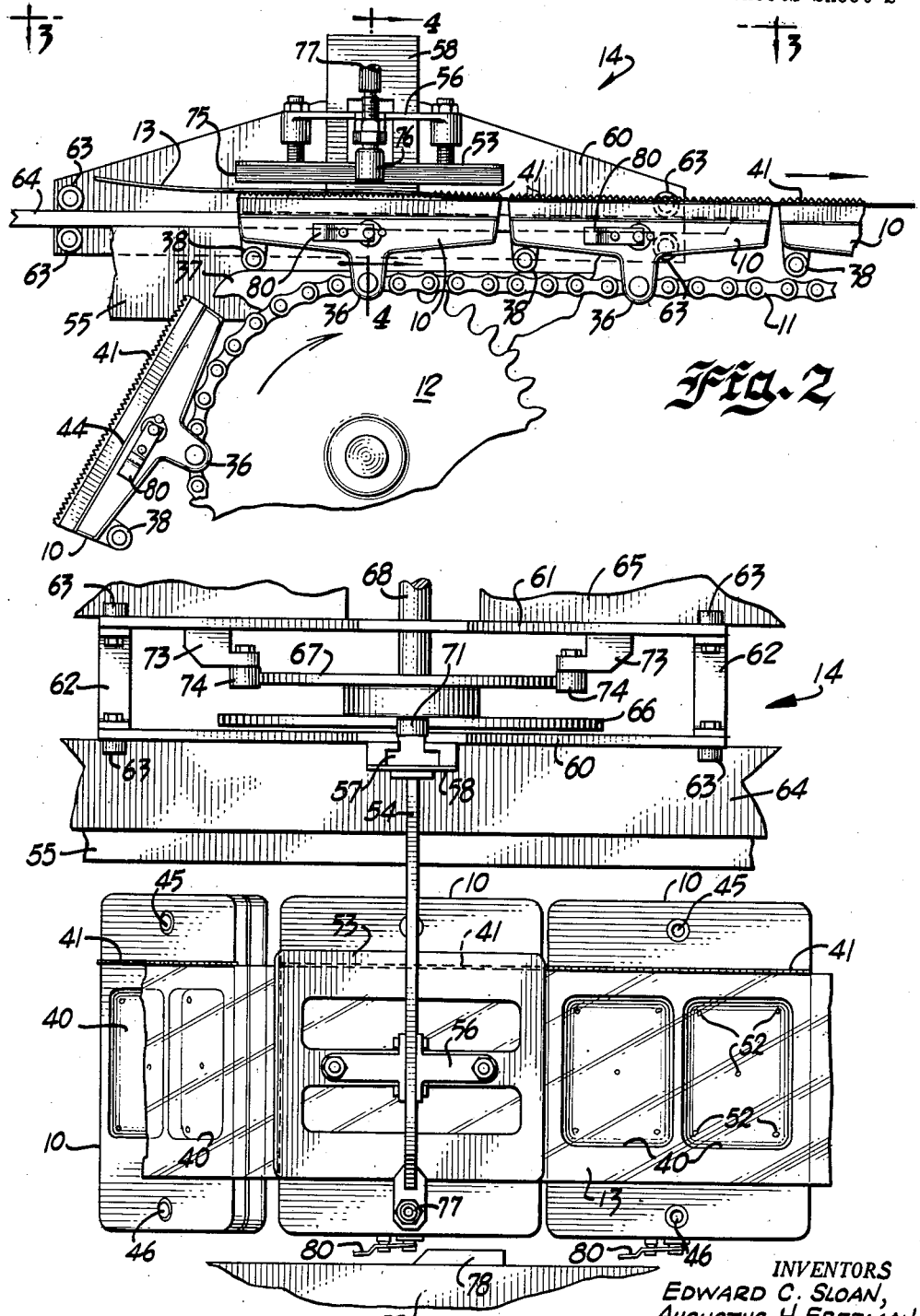

April 21, 1964 E. C. SLOAN ETAL 3,129,545
PACKAGE FORMING APPARATUS AND COMPONENTS THEREOF
Filed Oct. 11, 1960 13 Sheets-Sheet 3
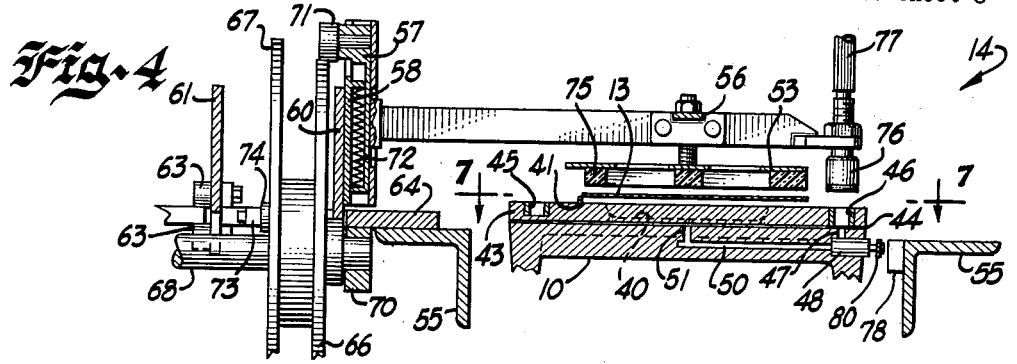
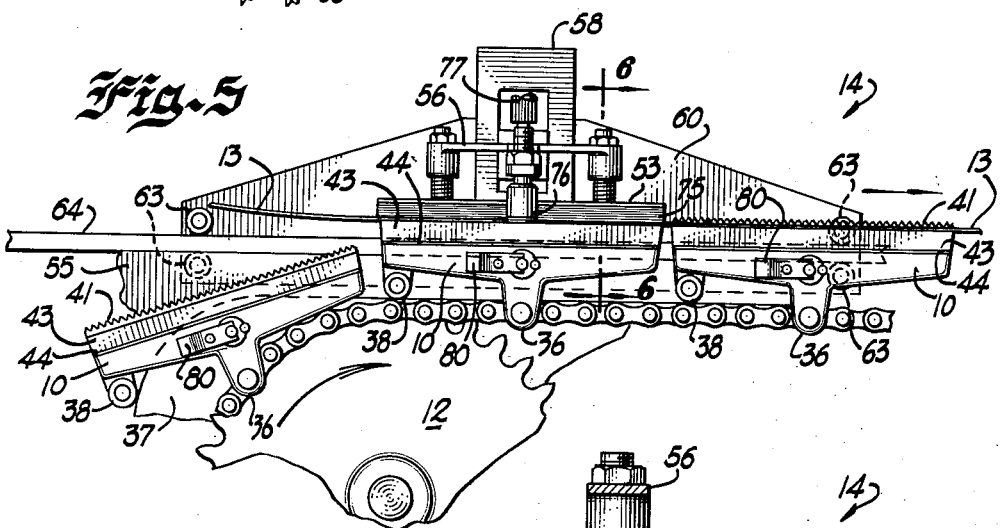
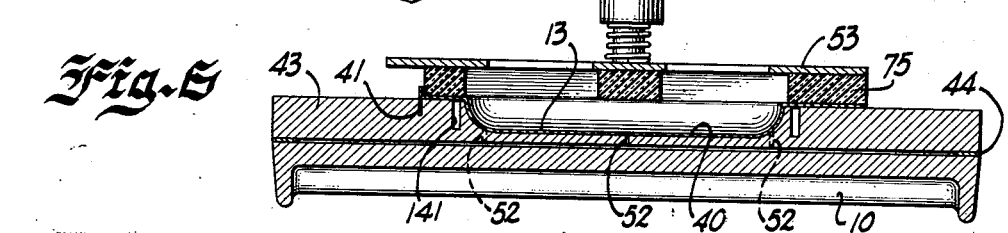
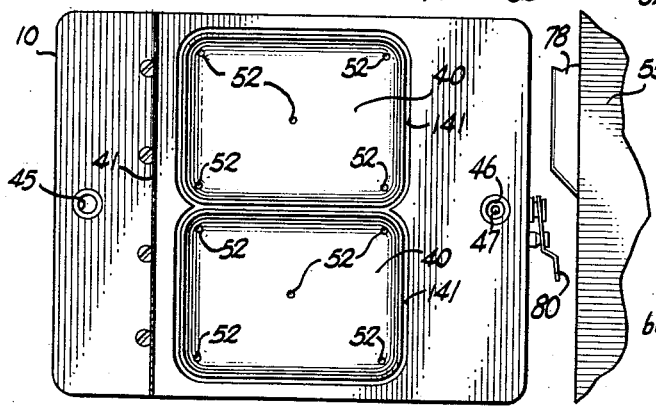
INVENTORS
EDWARD C. SLOAN,
AUGUSTUS H. EBERMAN
AND HANS A. JENSEN
by Cromwell, Greist and Warden
ATTORNEYS.

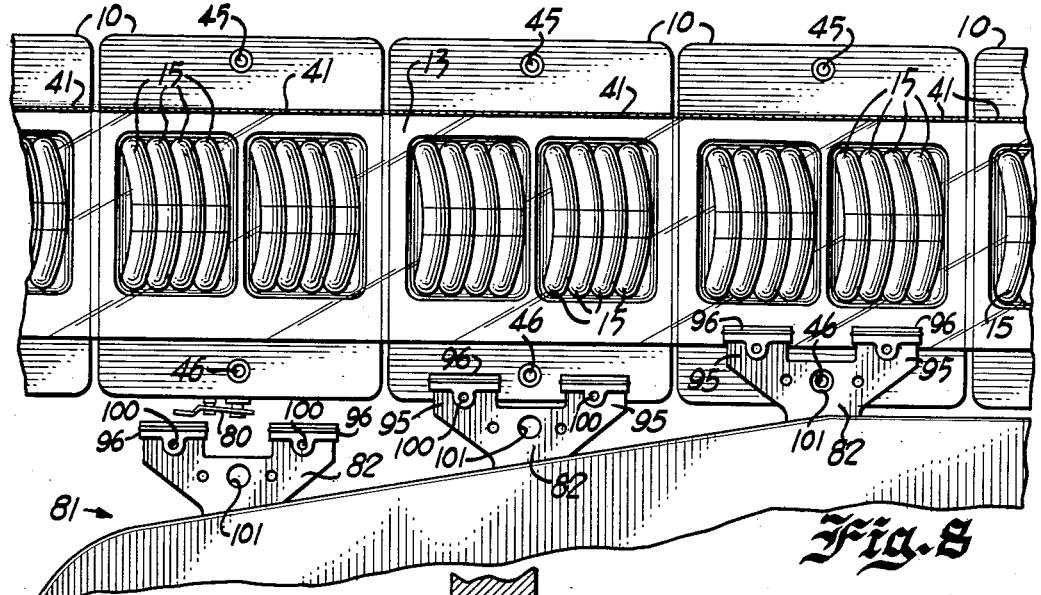
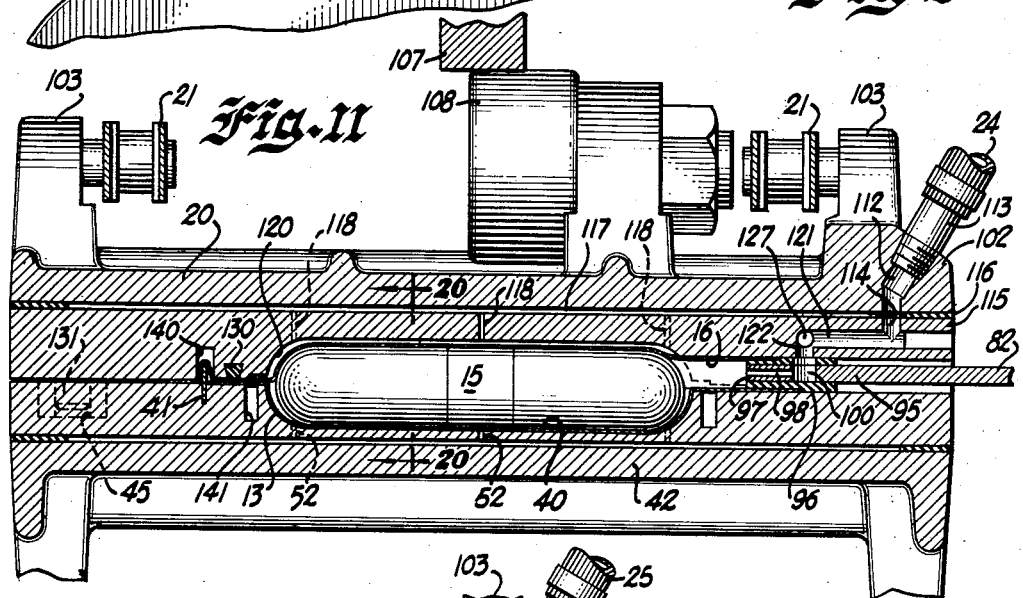
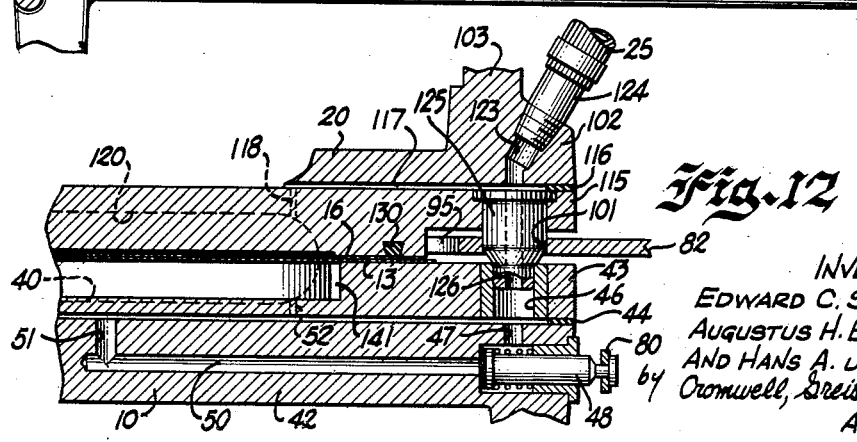

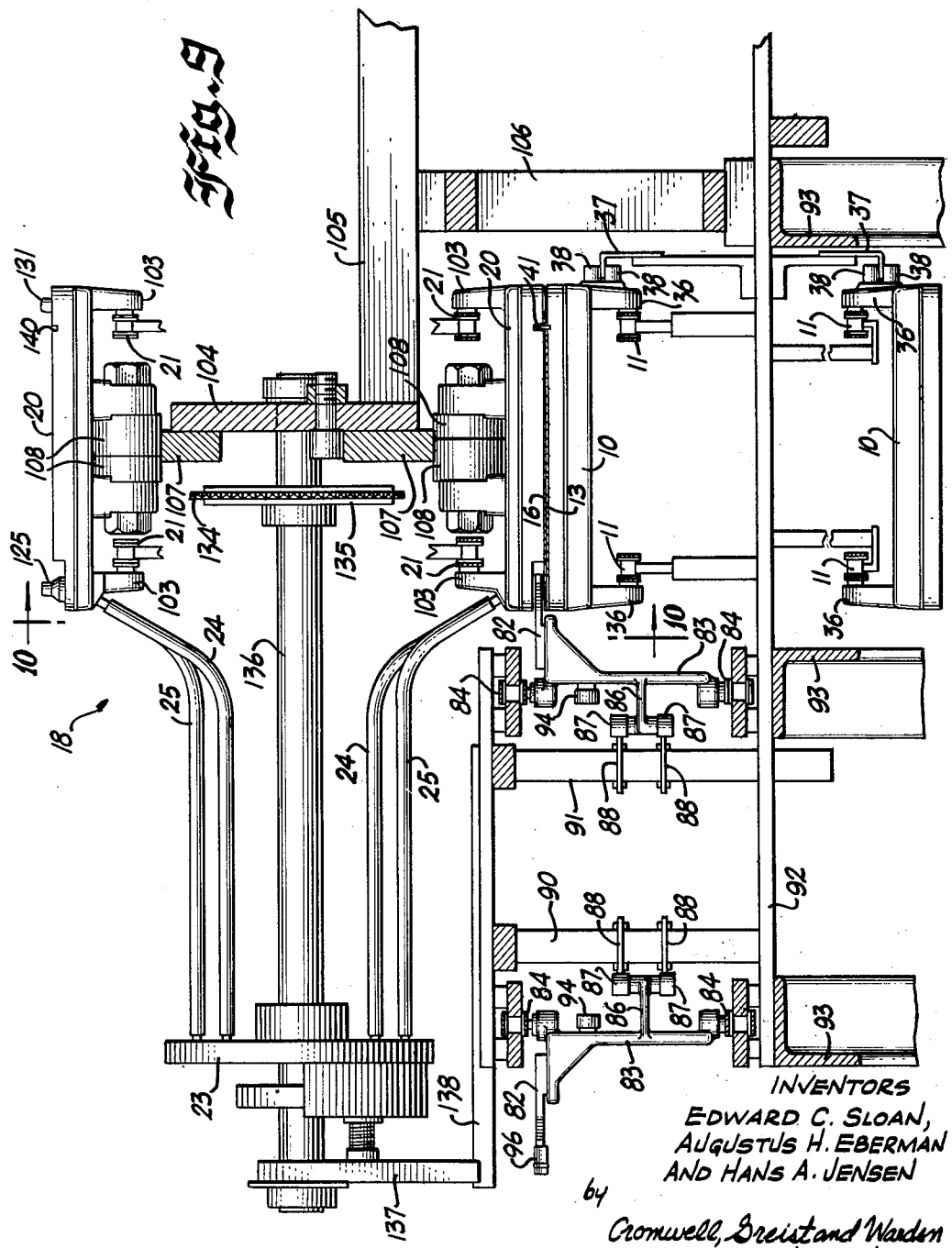

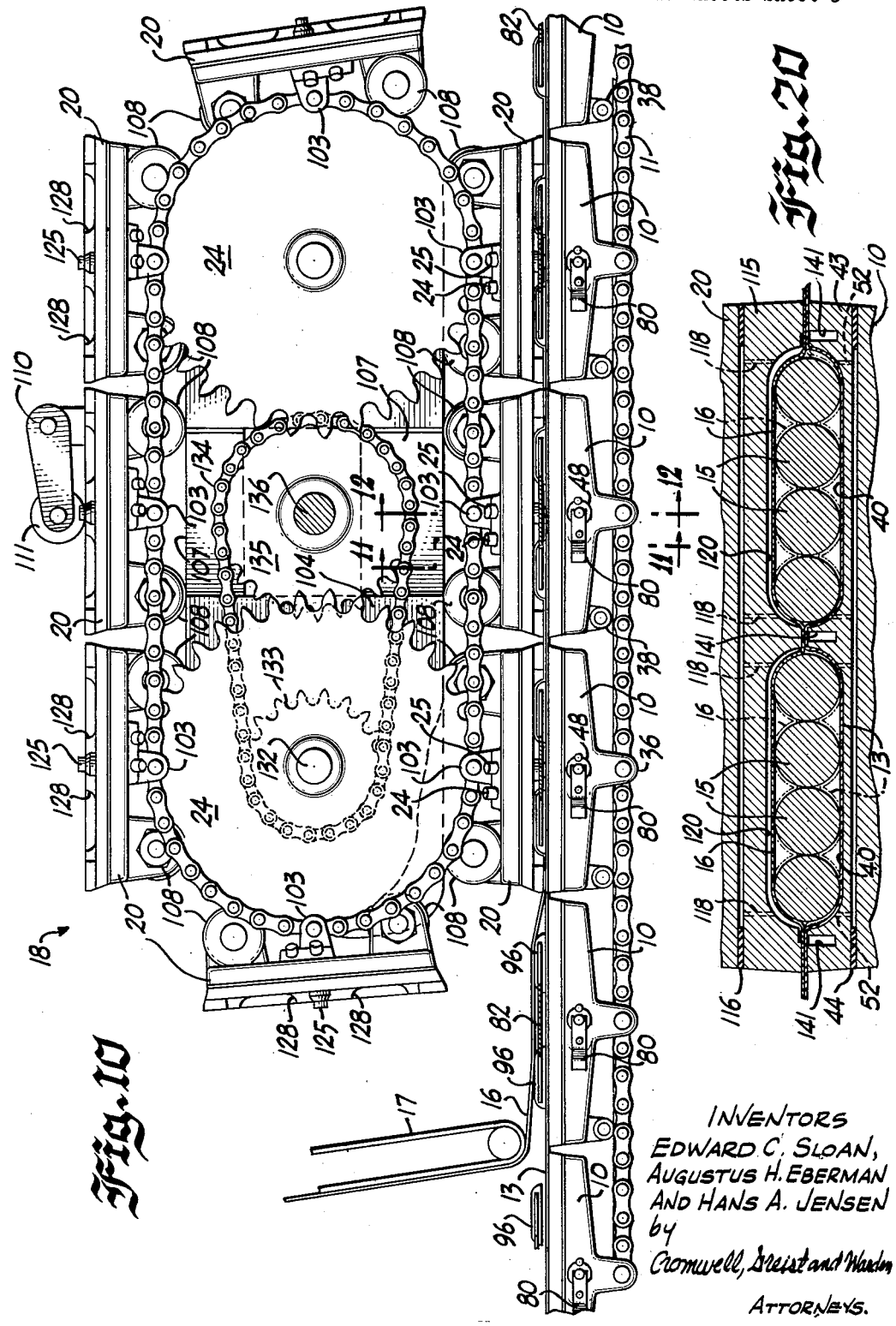

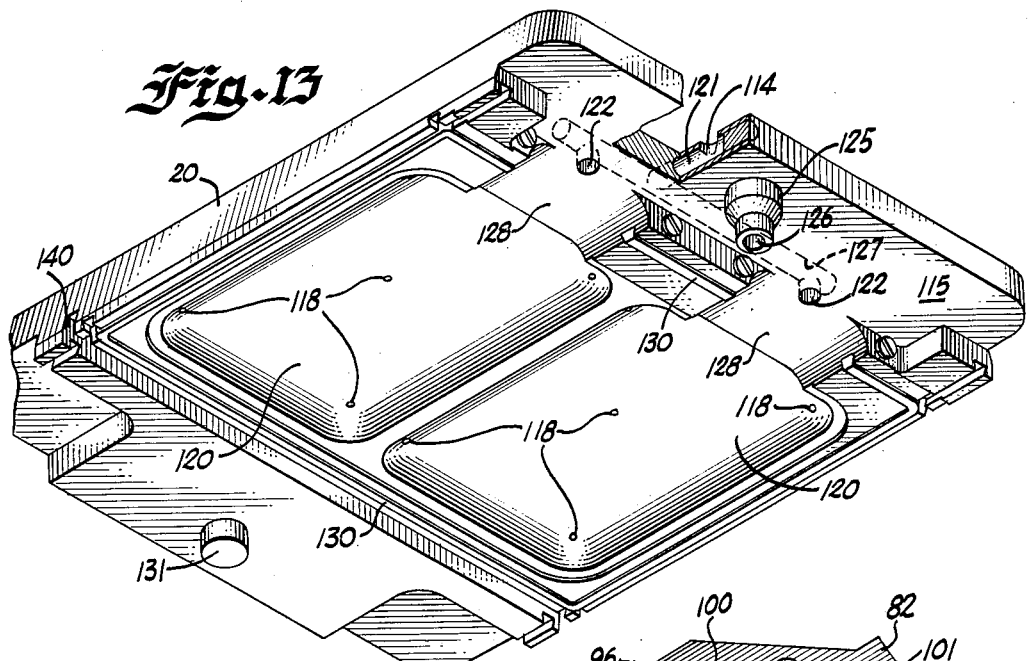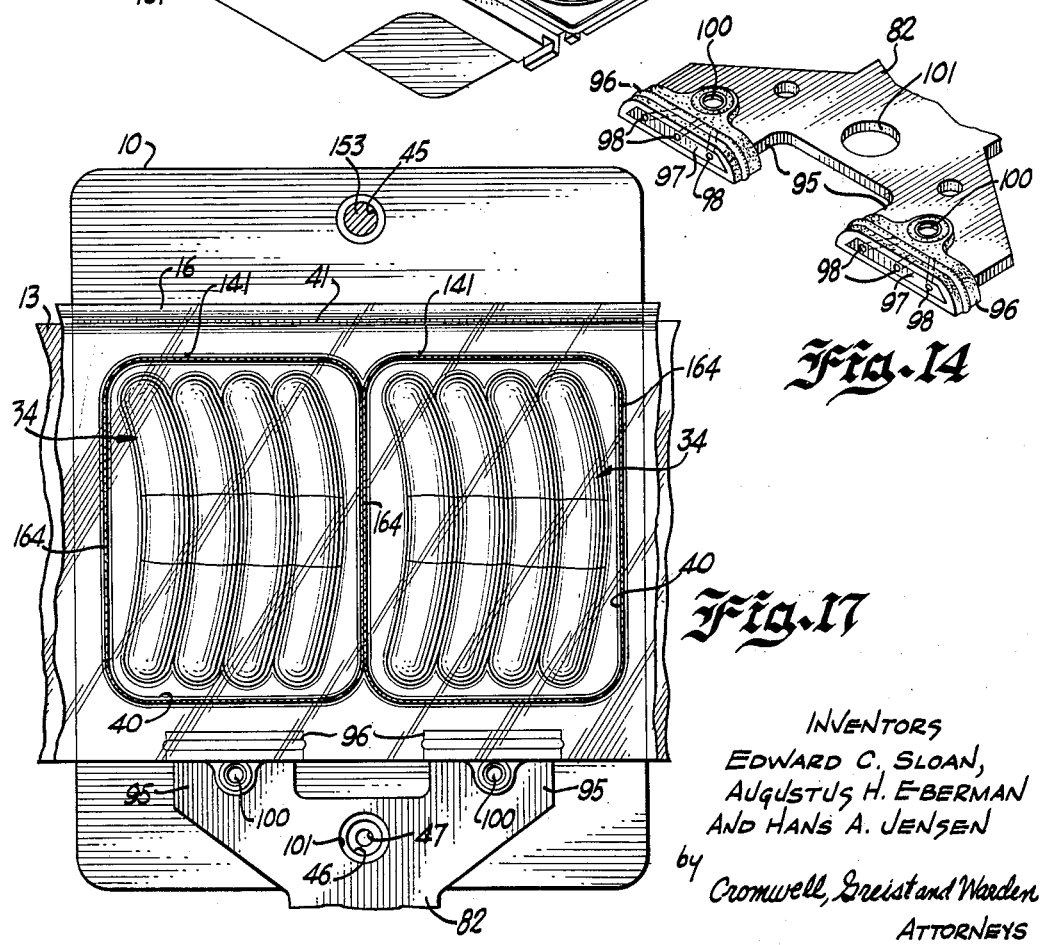

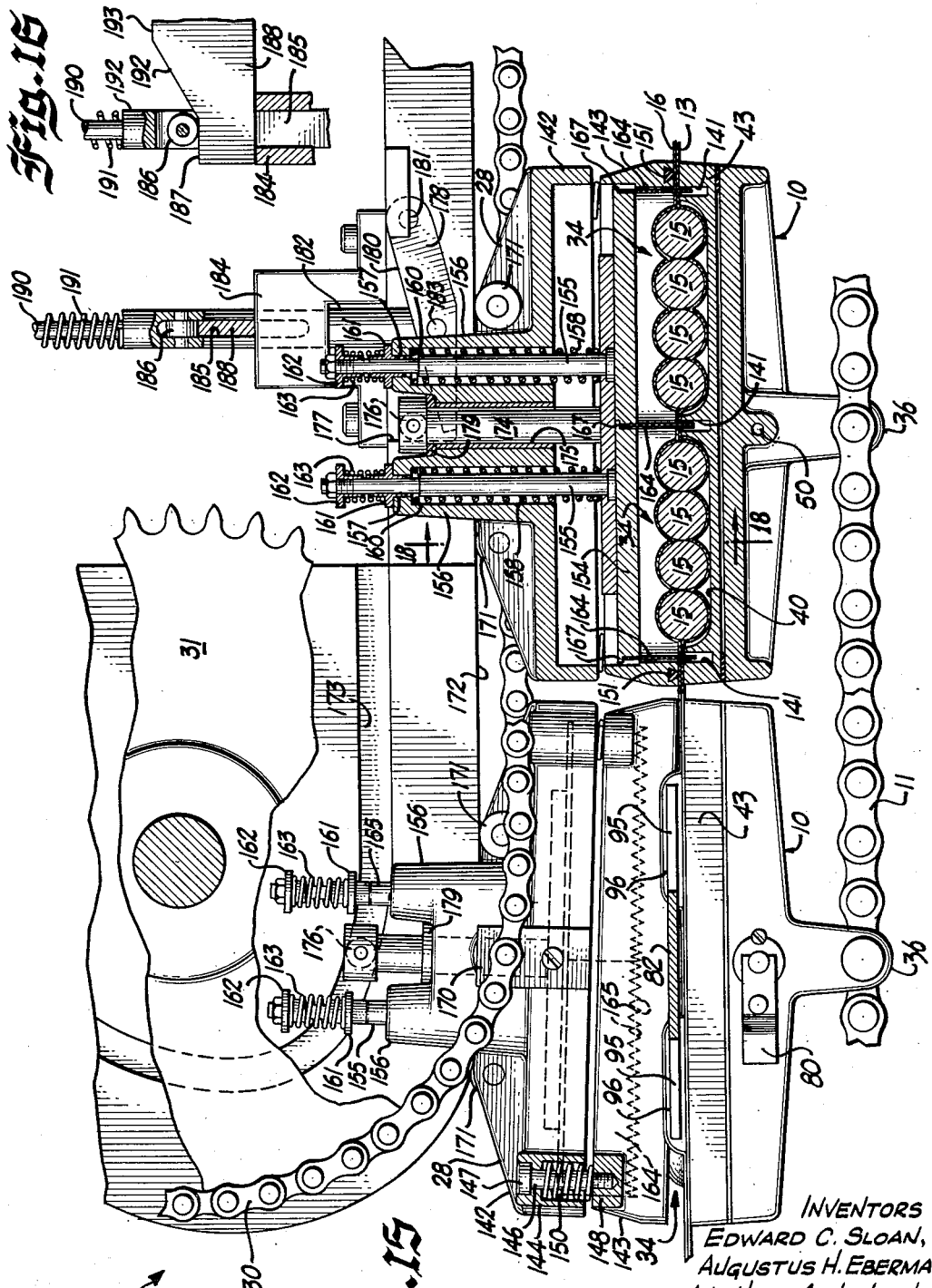

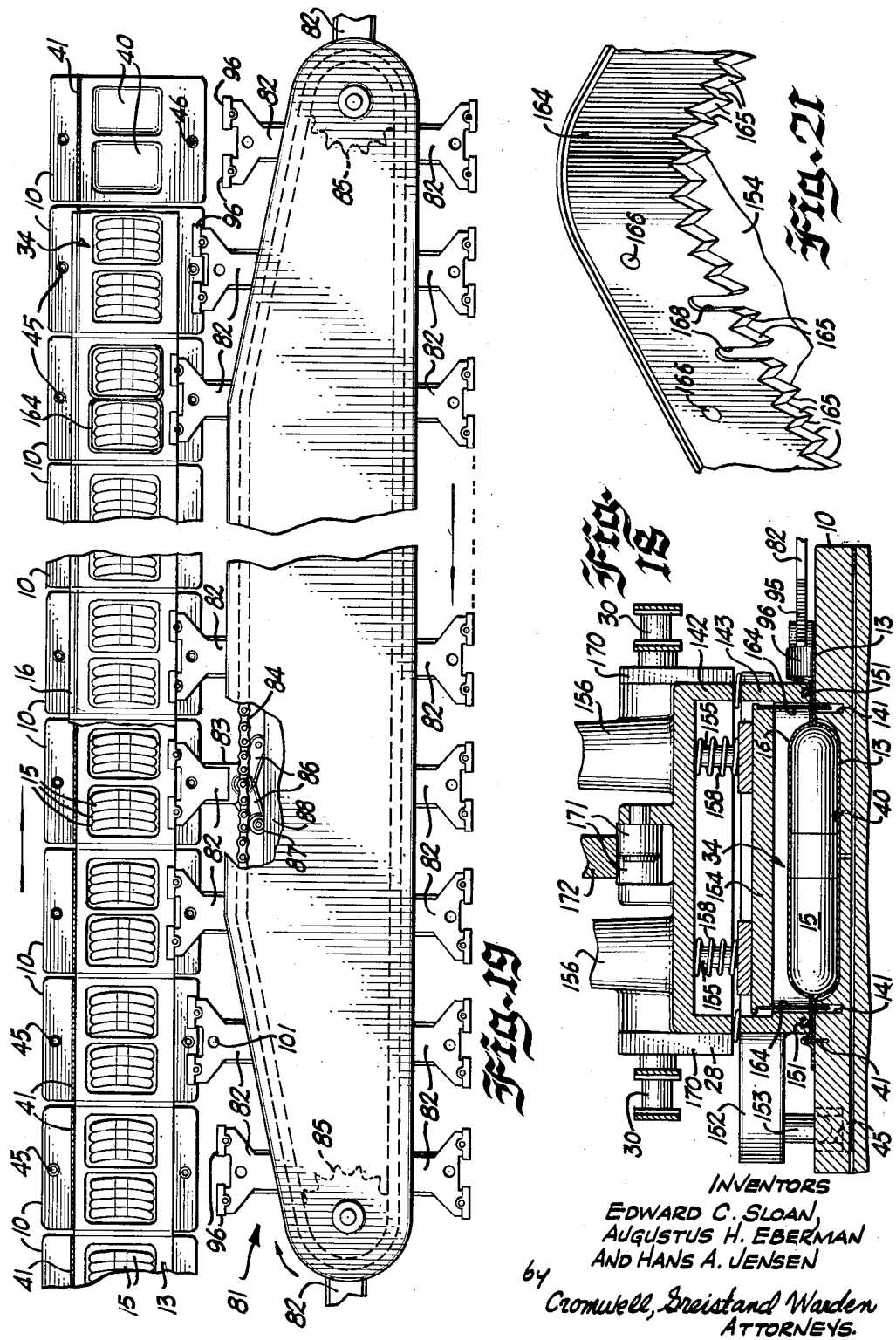

April 21, 1964  E. C. SLOAN ETAL  3,129,545
PACKAGE FORMING APPARATUS AND COMPONENTS THEREOF
Filed Oct. 11, 1960  13 Sheets-Sheet 10
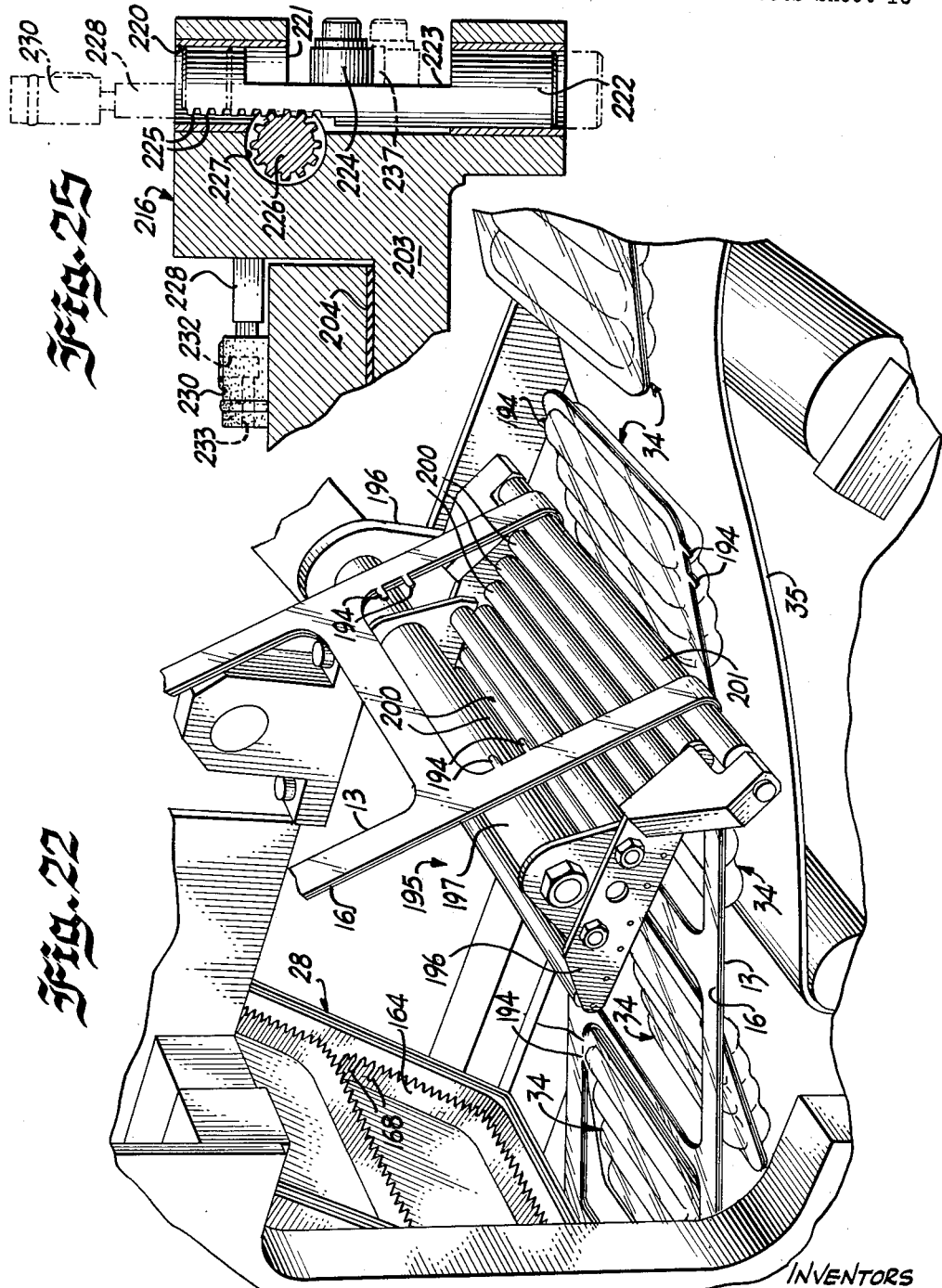
INVENTORS
EDWARD C. SLOAN,
AUGUSTUS H. EBERMAN
AND HANS A. JENSEN
by Cromwell, Greist and Warden
ATTORNEYS April 21, 1964 E. C. SLOAN ETAL 3,129,545
PACKAGE FORMING APPARATUS AND COMPONENTS THEREOF
Filed Oct. 11, 1960 13 Sheets-Sheet 11
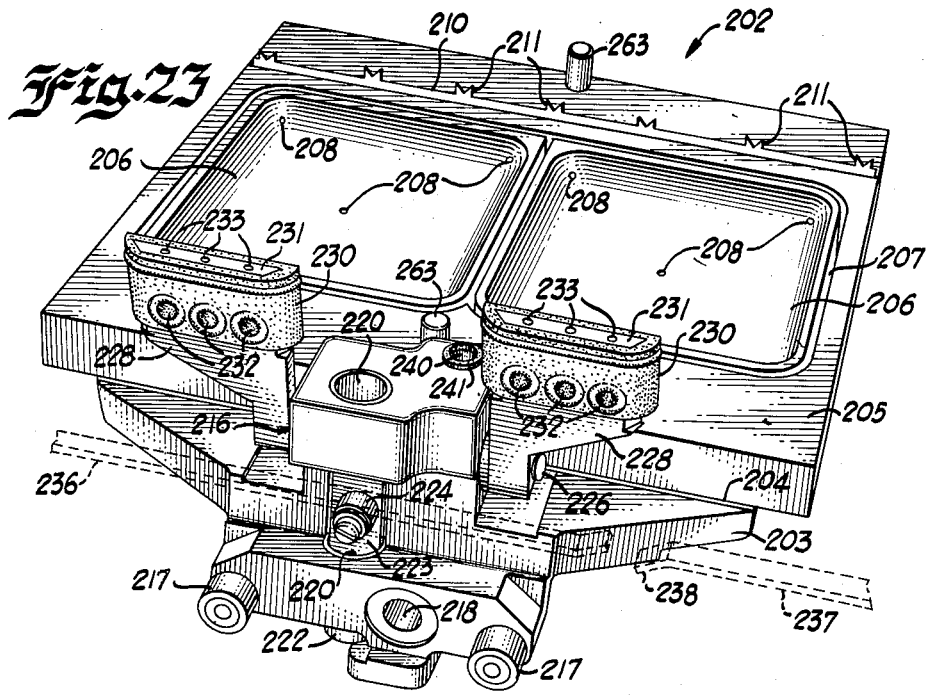
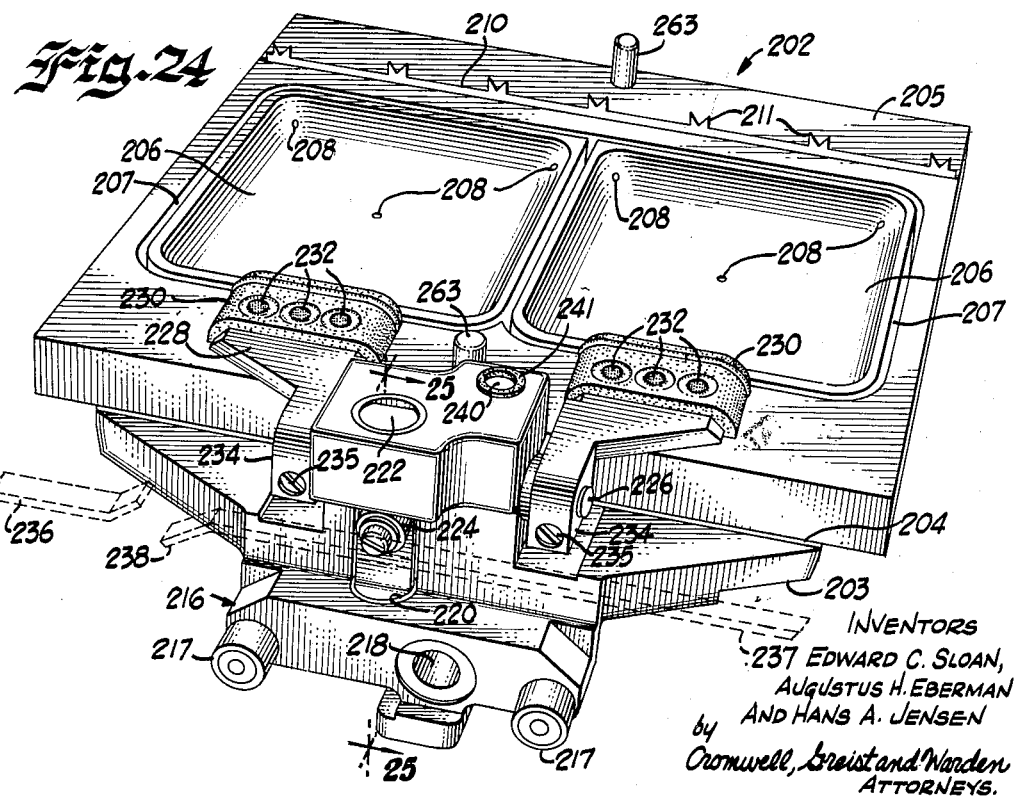
INVENTORS
EDWARD C. SLOAN,
AUGUSTUS H. EBERMAN
AND HANS A. JENSEN
by Cromwell, Greist and Warden
ATTORNEYS.

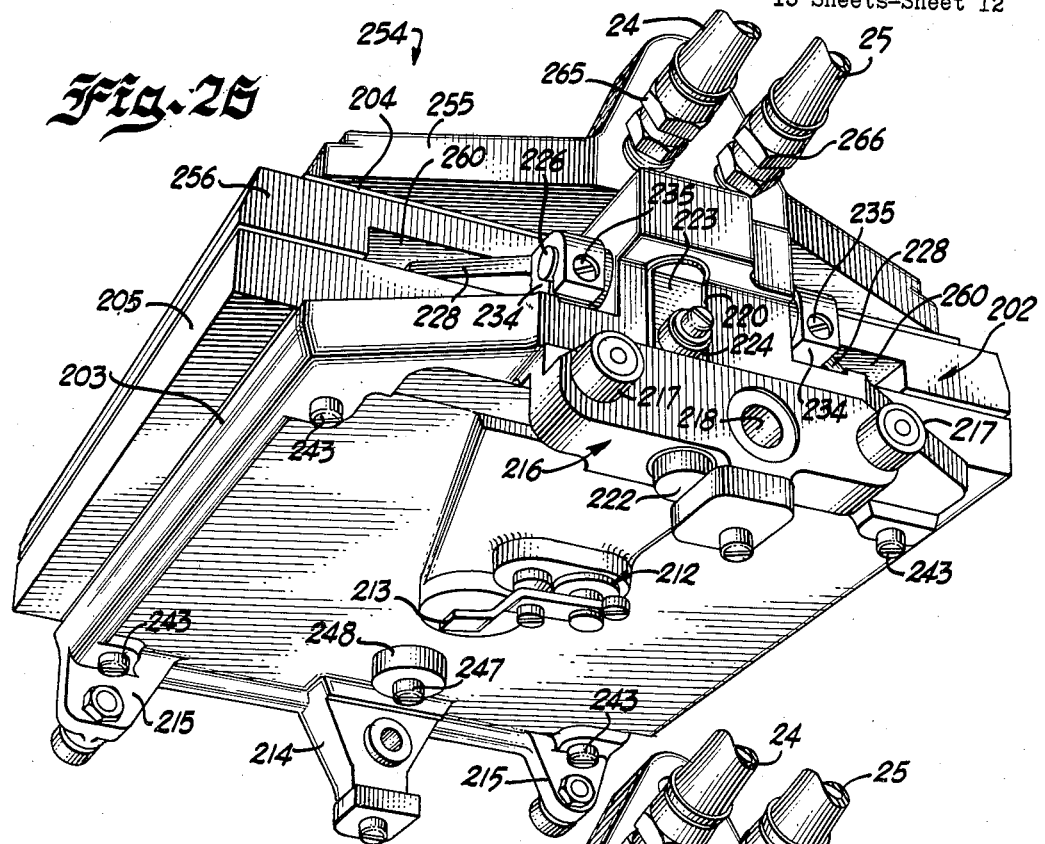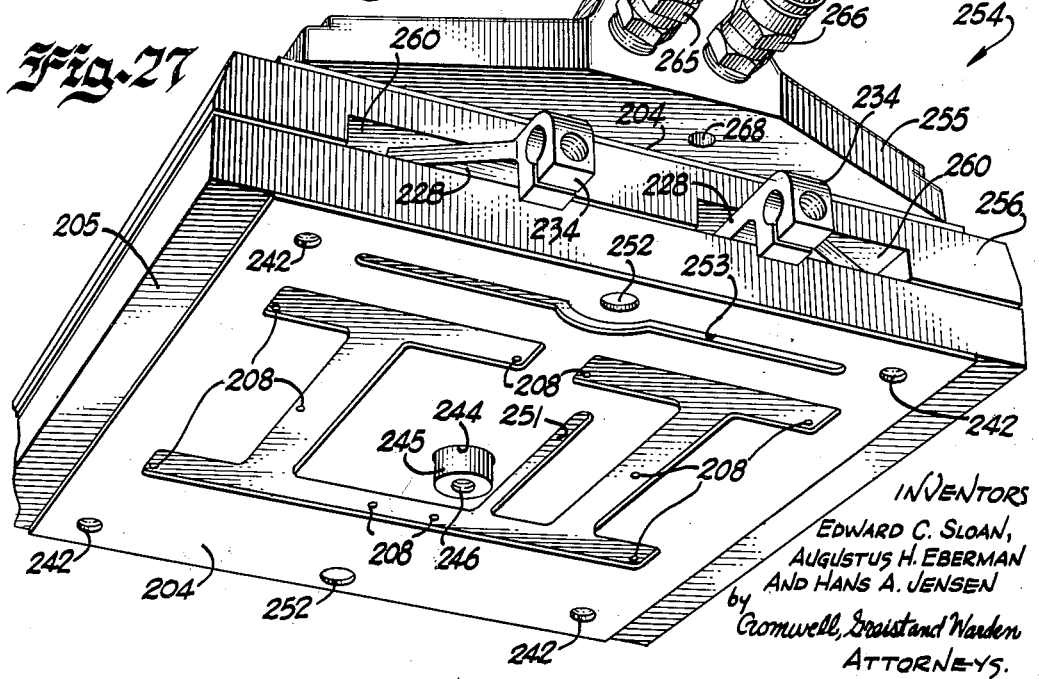

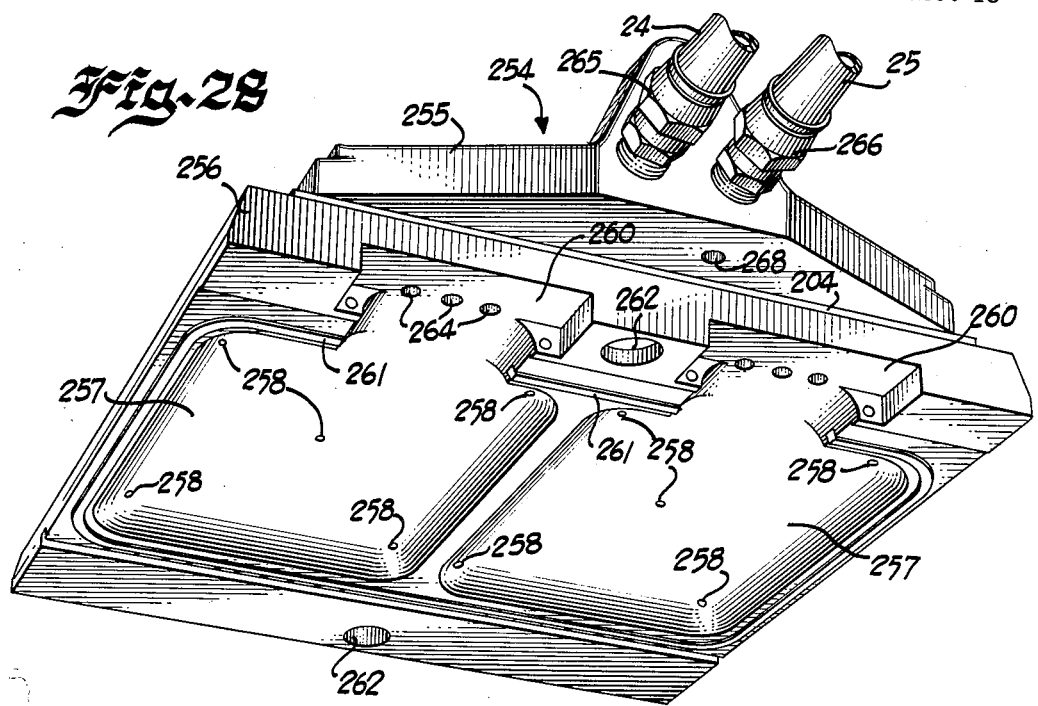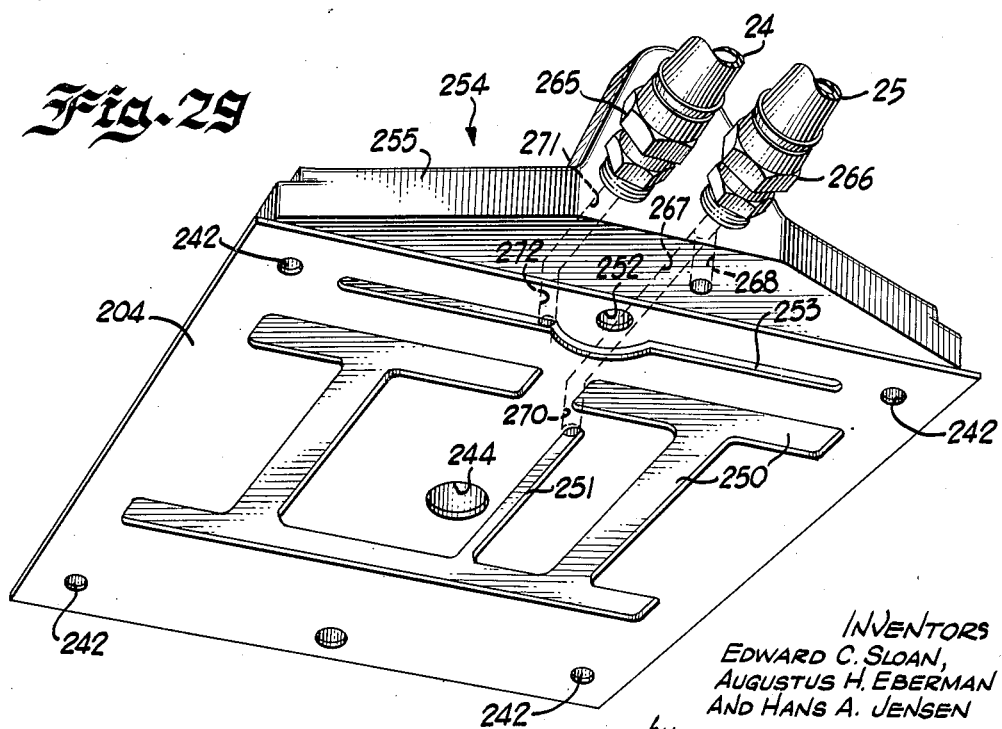

United States Patent Office 3,129,545
Patented Apr. 21, 1964

3,129,545
PACKAGE FORMING APPARATUS AND
COMPONENTS THEREOF
Edward C. Sloan, Augustus H. Eberman, and Hans A. Jensen, Madison, Wis., assignors to Oscar Mayer & Company, Inc., Chicago, Ill., a corporation of Illinois
Filed Oct. 11, 1960, Ser. No. 61,993
34 Claims. (Cl. 53—112)

The invention relates to package forming machines and components thereof by means of which hermetically sealed packages containing food products or other suitable materials may be automatically and continuously formed. More specifically, the invention deals particularly with new and improved packaging apparatus adapted for automatically and continuously forming packages from polyvinylidene chloride film while making advantageous use of the unique supercooled properties of such film.

This application is a continuation-in-part of our co-pending application Serial No. 711,916, filed January 29, 1958, issued as Patent No. 3,083,106, which in turn is a continuation-in-part of our co-pending application Serial No. 630,194, filed December 24, 1956. In the co-pending applications we disclose various advantageous uses of polyvinylidene chloride film in its supercooled state. Such film is formed from vinylidene chloride-vinyl chloride copolymers, such as "Saran," the film being extruded in the form of a thin sheet and immediately cooled as by advancing the same through a water bath maintained at a temperature of approximately 58° F. Merely by way of example, the film sheet may be adequately supercooled by being passed into the water bath within about 0.1 to 3.0 seconds following its formation by extrusion, the time during which the sheet passes through the bath ranging from about 1 to 5 seconds.

Polyvinylidene chloride film in its supercooled state remains amorphous until a combination of time and temperature conditions causes crystallization. Substantial stretching of supercooled polyvinylidene chloride film also results in crystallization with the crystals formed being at least substantially oriented. While the film is maintained in its supercooled state without any substantial crystallization occurring, the film may be sealed to itself merely by contact and without the necessity of applying film fusing heat. Thus, as disclosed in our co-pending applications, a pair of continuous sheets of supercooled polyvinylidene chloride may receive spaced accumulations of product therebetween with the product areas and film surrounding the same being successively enclosed by cooperating and continuously moving die forming means which in the course of operation under controlled vacuumization conditions bring about automatic contact between film packaging areas to completely enclose the product accumulations and automatically form self-sealed packages. The packages formed in this manner remain spaced along the continuously moving and now combined film sheets and the film is then crystallized to an adequate extent to at least substantially overcome the supercooled properties thereof after which the individual packages are automatically separated from the sheets.

Polyvinylidene chloride films used in the packaging operation described may vary in composition depending upon the particular packaging properties required thereof. By way of example, laminates of polyvinylidene chloride film may be continuously prepared by forming separate films and combining them continuously prior to package formation. Oxygen barrier polyvinylidene chloride film may be formed from approximately 90% vinylidene chloride and 10% vinyl chloride whereas a film exhibiting a high degree of flexibility may be formed from approximately 68% vinylidene chloride and 32% vinyl chloride. With these two different types of film combined as a single laminate, the special individual properties cooperate in forming a package which exhibits the requisite flexibility to protect against damage during handling as well as the requisite oxygen impermeability for extended shelf life of food products, particularly meat products. Further by way of example only, an oxygen barrier film may be formed with a thickness of about 0.001 of an inch whereas a flexible film may have a thickness of about 0.003 of an inch. Polyvinylidene chloride film may be laminated with other films exhibiting desirable package forming and product protecting characteristics such as polyvinyl chloride film and polyvinyl acetate film. Various combinations of the different films may be made while utilizing the sealing characteristics of the polyvinylidene chloride film in its supercooled state to form the package seal.

The sealing area of the package may vary as to the type of seal formed. In the fully supercooled condition of polyvinylidene chloride film, contacting of marginal portions of overlying sheets of film about a product will result in a peripherally continuous fused seal. This seal can only be broken by destruction of the film and, in effect, the contacted film portions become fused to an extent that they form a unitary mass. By providing for controlled warming of the supercooled film to an extent that crystallization is at least partially induced results in the forming of a hermetic seal which can be broken by separating the sealed film areas by peeling. This aspect of seal formation is fully covered in our aforementioned co-pending applications.

The special properties of the types of films described above particularly adapt the same for use in automatically and continuously operating package forming apparatus. Various forms of basic package forming apparatus are disclosed in our aforementioned co-pending applications and it is an object of the present invention to provide new and improved package forming apparatus and new and improved components therefor which are particularly adapted for use with supercooled polyvinylidene chloride film.

A further object is to provide a new and improved package forming machine which is capable of continuous and efficient package forming operation, the machine making use of cooperating series of continuously moving die forming means which receive therebetween packaging film and product to temporarily enclose the same and provide for automatic package formation in a new and improved manner.

Another object is to provide new and improved package forming die assemblies comprising cooperating die plates which receive packaging film and a product therebetween, the assemblies including unique package forming components which provide for new and improved package forming operation in an efficient, low cost manner.

Still a further object is to provide a new and improved package forming machine including a plurality of uniquely cooperating series of package forming and package removal components.

A further object is to provide new and improved package removal means adapted for use with the package forming apparatus of the present invention, the removal means providing for automatic positive package separation from a continuous sheet of combined films.

Other objects not specifically set forth will become apparent from the following detailed description of the present invention made in conjunction with the accompanying drawings wherein:

FIGS. 1A and 1B in combined form constitute a side elevational view of the package forming machine of the present invention, certains parts being shown diagrammatically and certain other parts being shown partially broken away or in section, the left-hand portion of FIG.

1B being a continuation of the right-hand portion of FIG. 1A as viewed;

FIG. 2 is a fragmentary side elevation of the bottom die plate vacuumization station forming a part of the machine and located at the left-hand portion of FIG. 1A;

FIG. 3 is a fragmentary plan view of the bottom die plate vacuumization station as viewed along line 3—3 in FIG. 2;

FIG. 4 is a fragmentary transverse section of the bottom die plate vacuumization station as viewed generally along line 4—4 in FIG. 2;

FIG. 5 is a view similar to FIG. 2 illustrating therewith sequential operational aspects of the bottom die plate vacuumization station;

FIG. 6 is an enlarged transverse section of a bottom die plate and operational components of the vacuumization station, this view being taken generally along line 6—6 of FIG. 5;

FIG. 7 is a fragmentary plan view of a bottom die plate illustrating the operation of a vacuum control valve forming a part thereof, this view being taken generally along lines 7—7 of FIG. 4;

FIG. 8 is an enlarged fragmentary plan view of a portion of the package forming machine illustrating certain operational aspects of the components thereof prior to package forming, this view being taken generally along line 8—8 in FIG. 1A;

FIG. 9 is a fragmentary transverse section of the package forming machine at the package forming station thereof as viewed generally along line 9—9 in FIG. 1A;

FIG. 10 is a fragmentary, partly sectioned side elevation of the various components of the package forming machine illustrating operational cooperation thereof at the package forming station which occurs at the right-hand portion of FIG. 1A;

FIG. 11 is an enlarged fragmentary transverse section of a closed package forming die taken generally along line 11—11 in FIG. 10;

FIG. 12 is an enlarged fragmentary section of a portion of a closed package forming die taken generally along line 12—12 in FIG. 10;

FIG. 13 is a fragmentary perspective of the die cavity portion of a top die plate;

FIG. 14 is a fragmentary perspective of a die plate vacuumization insert;

FIG. 15 is an enlarged fragmentary and partly sectioned view in side elevation of a part of the package removal station of the machine of the present invention, this station being shown in FIG. 1B;

FIG. 16 is a fragmentary section of a part of the package removal apparatus taken generally along line 16—16 in FIG. 15;

FIG. 17 is a fragmentary transverse section of a closed package removal die assembly taken generally along lines 17—17 in FIG. 15;

FIG. 18 is a fragmentary transverse section of the closed package removal die assembly taken generally along line 18—18 in FIG. 15;

FIG. 19 is a fragmentary plan view of a portion of the package forming machine as viewed along lines 19—19 in FIGS. 1A and 1B;

FIG. 20 is a fragmentary transverse section of the cavity portion of the closed package forming die assembly of FIG. 11 taken generally along line 20—20 therein;

FIG. 21 is an enlarged fragmentary perspective of a portion of the package removal knife means constituting a component of the package removal station of the machine;

FIG. 22 is an enlarged fragmentary perspective of package separation components forming a part of the machine and being located generally at the right-hand portion of FIG. 1B;

FIG. 23 is a perspective view of a modified bottom die plate adapted for use as a component of the package forming machine of the present invention;

FIG. 24 is a view similar to FIG. 23 illustrating certain operational aspects of the modified die plate;

FIG. 25 is a fragmentary section of a portion of the die plate taken generally along line 25—25 in FIG. 24;

FIG. 26 is a perspective view of cooperating top and bottom die plates of modified design, the bottom die plate of FIGS. 23–25 forming a part of the assembly illustrated;

FIG. 27 is a view similar to FIG. 26 but having the base plate portion of the bottom die plate of the assembly removed therefrom;

FIG. 28 is a perspective of the modified top die plate of the assembly of FIG. 26; and FIG. 29 is a view similar to FIG. 28 but having the cavity plate member removed from the top die plate to illustrate certain design features thereof.

As diagrammatically illustrated in FIGS. 1A and 1B, the package forming machine of the present invention includes an endless conveyor series of bottom die plates 10 which are suitably connected to endless belts or chains 11 which operate about pairs of spaced sprockets 12 one of which is suitably driven by power means not shown. The endless conveyor series of bottom plates 10 extends the full length of the machine with the plates being successively moved in the direction of the arrows in upright position from left to right as viewed and returned in inverted position from right to left as viewed. At the left-hand portion of FIG. 1A, a continuous sheet 13 of supercooled polyvinylidene chloride film is delivered to the series of bottom die plates from suitable film extrusion and film supercooling equipment not shown. As fully disclosed in our aforementioned co-pending applications, polyvinylidene chloride film is formed by extrusion in any suitable manner which is well known, the continuous film sheets are directed through a supercooling water bath while being guided by a roller system, and the film in its supercooled continuous sheet condition is delivered to the continuous series of bottom die plates and directed thereonto in overlying relation.

Upon each bottom die plate 10 receiving the bottom film sheet 13 in overlying relation therewith, components of a bottom die plate vacuumization station 14 operate with each bottom die plate 10 to draw the film sheet portion overlying the same centrally into a package forming cavity portion and adapt the cavity portion of the die plate for product loading. Continued movement of the die plates 10 beyond the vacuumization station 14 results in a product 15 being loaded therein upon the film 13 overlying the top surface of the die plate. Any suitable product loading apparatus such as that disclosed in our application Serial No. 711,916 may be used, such product loading apparatus not being illustrated as the same does not form a part of the present invention. Obviously, hand loading of the product may be resorted to if desired.

Continued movement of the loaded bottom die plates 10 results in the product received thereon being automatically covered by a continuously delivered top film sheet 16 of super-cooled polyvinylidene chloride. The film 16 as is also fully disclosed in our aforementioned co-pending application is delivered by a conveyor 17, partially shown, into product covering relation at the package forming station 18 of the machine. This station comprises an overhead endless conveyor series of top die plates 20 which are suitably attached to endless chains 21 or the like which in turn are carried by pairs of rotating sprockets 22. The top die plates 20 move in the direction of the arrows associated therewith and are synchronized with the operation of the bottom die plates to cooperatively join the same to form a fully enclosed package forming die. The top film 16 is directed into overlying contact with the die cavity face of each top die plate 20 and during the initial stage of top and bottom die plate combining, the top and bottom films 16 and 13 are maintained separated from one another in the product areas of the die plates until adequate vacuumization (and, if desired, inert gas sweeping) of the product areas is completed. Film separation and die vacuumization are accomplished by operation of a known type of rotary valve assembly 23 having a pair of flexible hoses 24 and 25 extending on each top die plate 20. This basic arrangement is fully disclosed in our co-pending applications and it will be understood that any suitable type of rotary valve assembly having a plurality of ports connected through flexible tubing or the like to the top die plates may be used in controlling the preferred sequence of package forming die vacuumization.

In the package forming station 18, individual product enclosing packages are formed by the combined die plates, these packages being located within the margins of the continuous film sheets 13 and 16 which remain unbroken. Thus a plurality of spaced and successive packages are formed when the sheets 13 and 16 are combined in the package forming station 18. The top die plates 20 are removed from cooperative association with the bottom die plates 10 following the package forming operation and are returned overhead for continuous re-use. The formed packages still connected in the combined continuous sheets 13 and 16 are continuously moved by the bottom die plates 10 through a film crystallization station, a portion of which is shown at the left-hand part of FIG. 1B. This station includes suitable film heating means 26 such as an infra-red heating unit which adequately raises the temperature of the combined films 13 and 16 to an extent that crystallization is sufficiently advanced to adequately overcome the supercooled properties of the film. While only an overhead heating unit is illustrated, a bottom unit positioned below the bottom die plates may also be used. In this regard the film heating station speeds up crystallization to a point that the film and packages formed therefrom may be readily handled without further self-fusing or sticking.

From the film crystallization station the packages and surrounding continuous film sheet portions are advanced by the bottom die plates 10 to a package cut-out or package removal station 27. This station includes an overhead endless conveyor series of package removal dies 28 which are suitably attached to an endless conveyor or chains 30 operating about pairs of spaced sprockets 31. The package removal dies 28 are operated in the direction indicated by the arrows and cooperatively combine with successive bottom die plates 10. In doing so suitable knife means forming a part of the removal dies 28 separate the individual packages from the surrounding continuous film sheets 13 and 16 with this surrounding film sheet portion in the form of waste 32 being withdrawn from association with the bottom die plates 10 and collected by a suitably driven roller unit 33. The separated packages 34 are dropped from the bottom die plates 10 as they move downwardly about the end sprockets 12 shown in FIG. 1B to begin their return to the front end of the machine in inverted position. The packages 34 dropping from the bottom die plates are collected on an endless conveyor 35 which delivers the same to a boxing and shipping station (not shown). The illustrations of FIGS. 1A and 1B are quite general in nature and are intended solely to set out the general operational aspects of the package forming machine and apparatus of the present invention. The subsequent description will deal specifically with certain new and improved machine components and operational aspects.

The bottom die plate vacuumization station 14 and the various components thereof are illustrated in detail in FIGS. 2-7. As best shown in FIGS. 2 and 5, each bottom die plate 10 is pivotally attached by an ear 36 forming a part thereof to a conveyor chain 11 which is suitably driven by the sprocket 12. The parts described are duplicated or arranged in pairs as best shown in FIG. 9, the pair of sprockets 12 being driven on a common shaft and the ears 36 of the bottom die plates being located along opposite sides thereof. During continuous movement of the bottom die plates 10 from the inverted position below the sprockets 12 upwardly around the sprockets into an upright position, the die plates are in engagement with a cam track 37 through means of a roller type cam follower 38 projecting from the bottom surface of the die plate adjacent an end thereof. Referring momentarily to FIG. 9, the cam followers 38 may be paired with the cam track 37 being L-shaped in cross section. With this arrangement each bottom die plate is provided with positive position control throughout its operative travel.

As best shown in FIGS. 3 and 7, each bottom die plate 10 is provided centrally thereof with a pair of die cavity portions 40 over which the bottom film sheet 13 is received as particularly shown in FIGS. 2-5. To one side of the die plate cavities 40 and extending in a direction coinciding with the direction of movement of the die plate series is an upstanding film engaging means in the form of a saw tooth band 41. As best shown in FIGS. 3 and 4, the bottom film 13 when received in covering relation over the die cavities 40 is of a width to be received adjacent the band 41. This band may be formed of any suitable material such as metal and is inserted in a suitable slot formed in the die cavity face of the die plate 10. The specific function of this band will subsequently be described.

Referring particularly to FIGS. 4 and 6, each bottom die plate 10 is formed from a base plate 42 and a cavity plate 43 with these plates being suitably secured together and centrally spaced from one another by an intermediate gasket 44. The gasket 44 is of a type to be described and, in effect, defines a vacuumization chamber or area between the base plate 42 and cavity plate 43. The cavity plate 43 is provided with vertical openings 45 and 46 located just inwardly from opposite side margins as illustrated in FIGS. 3 and 4. The opening 45 is a drive pin receiving recess to be described and does not communicate with the vacuum space or chamber between the plate portions 42 and 43. The opening 46 also does not directly communicate with the intermediate vacuum chamber defined by the gasket 44 but extends through a gasket portion and communicates with a vertical passage portion 47, a normally closed vacuum control valve unit 48 and an inwardly extending passage 50 to a vertically directed passage 51 which communicates with the vacuum chamber defined by the gasket 44 centrally thereof. The interior vacuum chamber is in communication with each package forming cavity through a plurality of small passages 52 (see FIGS. 6 and 7). These passages are preferably located at all corners of the die cavities and centrally thereof.

The vacuumization station 14 includes a generally reciprocating frame-like plate 53 which is fixedly mounted on a transverse arm 54 suitably mounted on an operating mechanism supported by one of the longitudinally extending L-shaped side frame members 55 between which the bottom die plate series move. The plate 53 is stabilized on the arm 54 by a cross arm 56 the ends of which are suitably attached to the plate 53. The arm 54 is attached to a spring housing member 57 which is vertically slideable in a cooperating spring housing member 58, this latter member being fixed on a cross plate 60 which parallels the adjacent side frame member 55. As best shown in FIG. 3, the cross plate member 60 forms a part of a shifting carriage assembly which moves backwards and forwards along an axis paralleling the longitudinal axis of the package forming machine. A back cross plate 61 is attached to the cross plate 60 by transverse bars 62 at opposite ends of the carriage and provided with a pair of rollers 63 on each end thereof which receive therebetween spaced edges of supporting plates 64 and 65. Received between the supporting plates 64 and 65 and the cross plates 60 and 61 is a pair of cam discs 66 and 67. These discs are eccentrically mounted on a rotatable shaft 68 which is suitably driven from the lower die plate power source (not shown) and is journaled in a member 70 (FIG. 4) which depends from the frame plate 65. The cam disc 66 has snugly seated thereagainst a cam follower in the form of a roller 71 which forms a part of the spring retainer 57. A compressed spring 72 is held captive between cooperating parts of the retainers 57 and 58 and functions to continuously urge the roller 71 against the surface of the cam disc 66. The cross plate 61 of the carriage previously described is provided with a pair of projecting arms 73 which carry thereon cam follower rollers 74 engaged with the cam disc 67 on opposite marginal portions thereof.

Rotation of the shaft 68 results in eccentric rotation of the cam discs 66 and 67 with the disc 67 through the rollers 74 moving the carriage back and forth along one side of the package forming machine. The cam disc 67 is shaped to provide the particular longitudinal reciprocating movement of the carriage described. The cam disc 66 is shaped so that upon rotation the cam follower roller 71 moves vertically up and down while being also moved with the carriage longitudinally back and forth along the side of the machine. During upward movement of the roller 71 the arm 54 rises and the spring 72 is compressed. This spring functions to return the arm vertically downwardly to conform to the camming configuration of the disc 66 and maintain the roller 71 in snug engagement therewith. With this type of operation the plate 53 is lowered over each continuously moving bottom die plate 10, moves with the plate throughout a specified distance, is raised upwardly from the plate, is returned to its initial position over the next successive bottom die plate 10 and is lowered for cooperation therewith in a continuous cycle of operation.

The cooperative functioning of the plate 53 with a bottom die plate 10 involves the pressing and peripheral flattening of the bottom film 13 against the cavity surface of the die plate and peripherally about the cavities 40 therein. The pressing effect is provided by a resilient frame-like base pad 75 formed from suitable rubber or rubber-like material which is compressible against the top surface of the bottom die plate 10 as shown in FIG. 6 to peripherally hold and seal the bottom film 13 thereagainst.

The outermost end of the arm 54 fixedly carries a downwardly directed, self-closing, nozzle-type vacuum impressing means 76 of known type which is suitably connected by a flexible hose 77 to a vacuum source (not shown). Downward movement of the plate 53 into engagement with a die plate 10 results in opening of the nozzle 76 in vertical alignment and peripherally sealed relation with the opening 46 in the die plate. The nozzle 76 may be provided with a bottom gasket engageable with the die plate surface to completely seal off the opening 46. In order to open the valve 48 and provide communication between the plate passage portions 46, 47 and 50, the machine main frame member 55 opposite the vacuumization equipment as best shown in FIG. 7 is provided with a cam block 78 which projects inwardly into the path of movement of the valve unit actuating lever 80. Depression of the lever 80 at the same time that vacuum is impressed in passage 46 results in opening of the valve unit and communication of the passage portions 47 and 50.

Vacuum is drawn through the internal passages now in communication and in the vacuumization chamber defined by the gasket 44 and ultimately through the small passages 52 communicating with the interior of the die cavities 40. The bottom film 13 completely covers the die cavities 40 and is fully peripherally sealed thereabout with the result that vacuumization of the bottom die plate causes the overlying film portions to be drawn downwardly into the cavities 40 as shown in FIG. 6. The supercooled state of the film 13 permits ready drawing or stretching thereof with the film remaining in its drawn or stretched condition. As previously described, amorphous polyvinylidene chloride film may be crystallized by stretching but it will be understood that the amount of stretching occasioned by the operational aspects just described is inadequate to cause any substantial crystallization of an extent that interferes with full utilization of the unique self-sealing or self-fusing properties of supercooled polyvinylidene chloride film.

With the film portions having been drawn downwardly into the cavities 40, the bottom die plate is now in condition to have product loaded thereon. Continued operation of the bottom die plate vacuumization apparatus results in the separation of the nozzle 76 from the die plate. The arm 54 at this stage of the cycle of operation will rise vertically and the carriage of the apparatus will shift longitudinally of the machine to bring the plate 53 and nozzle 76 into operative association with the next successive die plate 10. At the time of vacuumization apparatus separation, the cam block 78 terminates and the valve unit 48 closes to maintain the vacuum established in the chamber defined by the gasket 44. In this manner the portions of film which have been drawn into the die cavities 40 are retained therein by the vacuum. Any possible effect of "memory" or the like is thus overcome.

As previously described, following bottom die plate evacuation to draw the bottom film 13 downwardly into each die cavity 40, the die cavities are loaded with product 15. The particular product illustrated is of the sausage variety such as banded wieners, the product being deposited on the film 13 drawn into the cavities 40 by use of any suitable product loading equipment or by hand.

Immediately prior to movement of the product loaded bottom die plates 10 into package forming die relation with the top die plates 20 in the package forming station 18, a series 81 of continuously moving die forming means inserts combines with the bottom die plates along one side area thereof to place successive fork-like members 82 in cooperative association therewith. FIG. 19 illustrates the complete series of inserts 81 which extends co-extensive with the series of bottom die plates from a point just immediately prior to the package forming station 18 and to the end of the bottom die plate series subsequent to the package removal station 27. The forks 82 as best shown in FIG. 9 include a vertically extending portion 83 attached at the top and bottom thereof to endless conveyor chains 84 which are suitably driven about vertically spaced sprockets 85 (FIG. 19) in timed relation with the continuously moving series of bottom die plates 10. The vertical portion 83 of each fork 82 is provided with a pair of oppositely directed arms 86 extending inwardly and carrying at their outermost ends cam follower rollers 87 which are spaced vertically relative to one another. The rollers 87 engage a pair of vertically spaced cam tracks 88 suitably mounted on frame members 90 and 91 which extend throughout the die plate insert series 81. The support members 90 and 91 are in turn carried by a transverse main support plate 92 which are supported on bottom frame members 93 extending longitudinally of the package forming machine.

The operative mounting of the fork members 82 includes the same arrangement described in our co-pending application Serial No. 711,916, the successive fork members 82 being guided throughout their path of travel by the cam tracks 88 cooperating with the followers 87. The vertical portions 83 of each fork are further provided with a cam follower roller 94 which cooperates with a cam track not shown to slightly raise each fork 82 while the same comes into alignment with a bottom die plate 10 to lift each fork over the adjacent edge portion of the bottom film 13 to prevent bunching or other damage to the film. This lifting feature is illustrated at the left-hand portion of FIG. 10. Once the fork 82 is properly positioned over the adjacent film portion and bottom die plate 10, the fork is lowered into resting engagement on the edge portion of the film. This particular operational aspect is fully disclosed in our last mentioned application.

Each fork member 82 as best shown in FIG. 14 includes a pair of spaced projecting insert portions 95 which are clad fully around their outer ends with a rubber or rubber-like member 96 which is designed to provide a complete seal against opposed surface portions of top and bottom die plates when the same are combined for package forming purposes as will be described. The vertical end face 97 of each projection 95 is exposed and has drilled therethrough a plurality of outwardly opening passages 98 which extend inwardly in converging relation and into communication with a vertical opening 100 extending through the top of the member 96 and the underlying portion of the fork projection 95. As best shown in FIG. 11, the bottom surface portion of the member 96 closes off the opening 100 at the bottom thereof and this opening is available only through the top surface of the insert and through the outer vertical face 97 thereof.

With the combining at the forks 82 with the bottom die plates 10, the top film 16 is delivered over the bottom die plates 10 as shown in FIG. 10 simultaneously with the joining of the top die plates 20 with the bottom die plates 10. Each fork 82 is provided with a central opening 101 which upon positioning over a bottom die plate 10 becomes directly aligned with the opening 46 in the cavity plate member 43 of the bottom die plate 10 previously described. This alignment is best shown in FIG. 12.

FIGS. 9 and 10 illustrate the operational mounting of the series of top die plates 20 in the package forming station 18. Each top die plate 20 is formed from a base plate portion 102 which is provided with a pair of chain attachment ears 103 located along opposite side margins and suitably connected to a pair of supporting chains 21. This arrangement is much the same as described above in connection with the operational mounting of the bottom die plates 10 in that the plate supporting chains 21 are suitably mounted about paired sprockets 24 only two of which are shown in FIG. 10. Positive positioning of the successive top die plates 20 during operational movement thereof is obtained by a cam track structure 104 (FIG. 9) suitably supported in the center of the top die plate assembly by one or more transverse beam members 105 which in turn are supported by vertical frame members 106 mounted on the main transverse frame plate 92 of the machine. The cam track assembly 104 includes a continuous cam track 107 in engagement with cam follower roller assemblies 108 suitably mounted on the rear face of the base plate member of each top die plate 20 between the attaching ears 103 thereof. This camming arrangement provides a positive guide for the series of top die plates 20 to maintain proper positioning thereof during movement and return through the package forming cycle. Mounted above the series of top die plates 20 is a spring loaded roller assembly 110 which includes an oil absorbent roller 111 engaging the die cavity face of each top die plate 20 when the same passes thereunder to coat the same with a suitable release agent to guard against any possible sticking of the supercooled film thereto during package formation.

Referring particularly to FIG. 11, each top die plate 20 is generally similarly constructed as a bottom die plate 10 previously described. The top die plate is formed with the base plate portion 102 having a drilled opening 112 therein which has suitably threaded therein a hose connection nipple 113 which in turn is attached to a hose 24 extending to the rotary vacuum valve assamly 23. The passage 112 communicates with a vertical passage 114 formed in a cavity plate portion 115 forming a part of the top die plate structure. The cavity plate portion 115 is suitably attached to the base plate portion 102 and is spaced therefrom by an intermediate gasket member 116 which among other things peripherally seals the plate portions together. As in the assembly of the bottom die plate 10, the gasket 116 defines a centrally located, transverse slot-like area 117 and a portion of the gasket 116 as viewed at the right-hand side of FIG. 11 seals off the combined passages 112 and 114 from the vacuumization zone 117. This zone is in communication with a plurality of vertically directed small passages 118 which in turn are in communication with die cavities 120 formed in the face of the cavity plate portion 115 corresponding to and mating with the die cavities 40 of a cooperating bottom die plate 10. The vertical passage 114 of the cavity plate portion 115 of each top die plate 20 is in communication wtih a horizontally inwardly directed passage 121 which in turn communicates with a vertical passage 122 opening onto the face of the die plate portion and aligned with the vertical opening 100 of a projecting insert portion 95 of a fork 82.

Referring to FIG. 12, each top die plate 20 further includes a drilled passage 123 having threadedly received therein a hose attachment nipple 124 which connects a flexible hose 25 to the top die plate. The passage 123 extends vertically downwardly into communication with the transverse vacuumization area 117 and in its area of communication the gasket 116 merely peripherally seals the combined die plate portions 102 and 115. The adjacent portion of the cavity plate portion 115 is suitably aperture to receive therein a nozzle member 125 which projects downwardly from the face of the top die plate member and is dimensioned to be received in the opening 101 of a fork 82 and extend therethrough with its tapered lowermost end being snugly received within the opening 46 of a combined bottom die plate 10. The nozzle member 125 is provided with a vertically directed internal passage 126 which places the hose 25 in communication with the bottom die plate 10. This nozzle member also functions as a drive pin in opening 46.

Referring particularly to FIG. 13, the cavity face of the cavity plate portion 115 of a top die plate 20 is illustrated in detail. It will be seen that the passage 114 communicating with the passage 121 is further in communication with a right angled passage 127 which is then in communication with a pair of spaced passages 122 of the type previously described. This arrangement is necessary in order to provide suitable communication between the hose 24 of FIG. 11 and the pair of projecting insert portions 95 of a fork 82. Each end portion of a die cavity 120 is defined with a recessed area 128 which accommodates a fork insert portion 95 with the passages 122 becoming aligned with the passages 100 and 98 in each fork insert portion. In order to seal the engaging faces of the cooperating top and bottom die plates, the cavity plate portion 115 of each top die plate 20 is appropriately grooved about the cavities 120 therein and projecting gaskets 130 are inserted in the grooves. Each cavity plate portion 115 is further provided with a projecting drive pin 131 which is received in a drive pin opening 45 of a bottom die plate 10. The mating of these elements is shown in FIG. 11.

As previously described, the conveyor series of bottom die plates 10 may be suitably driven from a single power source. This power source is also adapted to drive the bottom die plate vacuumization equipment at the station 14. Furthermore, by reason of the mating drive pin arrangement described with regard to the top and bottom die plates, the same power source also drives the overhead series of top die plates at the package forming station 18. Additionally, with the rotation of the sprocket 24 viewed at the left of FIG. 10, the shaft 132 thereof also rotates and carries thereon a sprocket 133 which through a chain 134 drives a sprocket 135 fixed on a shaft 136. Referring to FIG. 9, the shaft 136 is suitably journaled at its innermost end in the cam track assembly 104 and is attached at its other end to the rotary valve assembly 23 and suitably connected thereto to operate the same in synchronized relation with the operation of the overhead top die plate assembly. The rotary valve assembly 23 is suitably mounted by a frame member 137 on a transverse frame member 138 which in turn is supported by the vertical frame members 90 and 91. A single source driving arrangement of this nature provides for complete synchronization of the various components making up the multiple stations.

Referring particularly to FIG. 11, the actual mating of the top and bottom die plates results in complete covering of the product 15 within the cooperating die plate cavities 40 and 120. The bottom film 13 as previously described has been drawn downwardly into the bottom die plate cavities 40 and the product 15 rests thereon. The top film 116 is of slightly greater width than the bottom film 13 and extends over the product 15 in the cavities 120 and outwardly thereof in overlying relation with the band 41 of each bottom die plate 10. In FIG. 11 it is shown that along the left-hand margin as viewed the top film 16 is pressed against the bottom film 13 and extends over the top of the band 41 and is punctured thereby to be retained in position during the package forming operation. Complete mating of these die plate surfaces is provided by a groove 140 extending along the upper die plate 20 and in which is received the projecting film retention band 41. The bottom die plate 10 is provided with peripheral grooves 141 extending about the cavities 40 thereof but these grooves do not perform a function during the package forming operation and are intended to function during the package removal operation as will be described.

Still referring to FIG. 11, the right-hand margins of the films 13 and 16 as viewed therein are separated by the insertion of the projections 95 of the fork 82 received between the top and bottom die plates. In this regard communication with the interior of the package and the product itself is provided through the combined passages of the fork insert 95 and those aligned therewith in the top die plate 20. The remaining margins of the cavities of the die plates tightly clamp the film portions received therebetween as shown in FIG. 20 and the only access into each package being formed in the combined die plates is through a projecting insert portion 95 of a fork 82. The die plates are closely clamped together by operation of the cam track 107 through the roller assemblies 108.

With the die plates completely closed the vacuum forming cycle may be commenced. This cycle may vary and the description thereof included herein is merely by way of example. A vacuum is drawn through the tubes 24 and 25 by operation of the rotary valve assembly 23 and as shown in FIG. 12 this results in vacuumization of the transverse vacuum areas defined by the gaskets 44 and 116 and vacuumization of the combined die cavities 40 and 120 through the passages 52 and 118. The vacuum release valve unit 48 is opened just prior to the vacuum cycle by a suitable cam block not shown but similar to the block 78 previously described. The vacuum drawn in the cavities 40 and 118 behind the film areas therein results in the holding of the film areas against the cavity surfaces and, in effect, away from the product. This prevents complete combining of the film portions during evacuation of the interior of the package about the product 15. Flushing may be brought about by the injection of an inert gas or the like through the tubing 24 and related passages leading between the film portions 13 and 16 through the projecting fork insert portions 95 as shown in FIG. 11. Complete sweeping of the interior of the package is made possible by this arrangement bearing in mind that the rotary valve assembly 23 may be designed to operate for intermittent inert gas injection and purging but during this particular cycle of operation any purging will be brought about under vacuum conditions which are incapable of overcoming the vacuum impressed on the film portions within the cavities through the tubing 25 to prevent the same from collapsing about the product.

Following evacuation of the interior of the package and the removal of any air and oxygen therefrom, the package is now ready to be completely sealed. To bring this about the tubing 25 is opened to the atmosphere and the vacuum established thereby in the die plates and behind the film portions received in the combined cavities is fully broken. Meanwhile, a sharp vacuum is impressed on the tubing 24 and the interior of the package is fully evacuated. This causes complete drawing of the film portions surrounding the product together to an extent indicated by the broken lines in FIG. 20. The spaced portions of the films 13 and 16 extending between the end faces 97 of the fork insert portions 95 are sharply drawn together to completely seal this marginal area of each package. The supercooled properties of polyvinylidene chloride film facilitate the type of package formation described and permit complete drawing of the film into close contour conforming contact with the product surfaces. The particular type of package 34 formed in the manner described is fully disclosed in our co-pending application Serial No. 711,916 and is best shown in FIG. 22. However, other types of packages may be formed with the apparatus of this invention.

As previously described, following package formation and the separation of the top die plates 20 from their associated bottom die plates 10, the packages still attached to surrounding continuous and combined sheets of film are conveyed through a film crystallization zone including the heater unit 26 or a plurality of such units shown in FIG. 1B. The heating of the packaging film is carried out to an extent that the supercooled properties thereof are adequately overcome to permit ready package handling following package removal.

The packages still supported by the bottom die plates 10 after passing through the film crystallization zone reach the package cut-out or removal station 27 which includes the endless series of package removal dies 28. Referring particularly to FIGS. 15 and 18, each package removal die 28 is formed from a downwardly opening, cup-shaped base member 142 having resiliently mounted therebelow a box-like frame member 143 which is of the same dimension as the inner cup-like portion of the base member 142. As shown in the left-hand portion of FIG. 15, each frame member 143 is resiliently mounted to a base member 142 at the four corners thereof by a spring and pin assembly. The base member 142 includes a downwardly opening housing portion 144 provided with an annular shoulder portion 145 of reduced diameter through which a pin 146 is received. This pin is provided with an enlarged head portion 147 which abuts the top surface area of the shoulder 145 but which is free to move upwardly therefrom. The lowermost end of the pin 146 is suitably fixed to an attachment portion 148 forming a part of the frame member 143. A coil spring 150 surrounds the pin 146 and is seated at its upper end against the undersurface of the shoulder 145 and at its lower end against the upper surface of the pin attachment portion 148. Thus when the frame member 143 engages the top surface of a bottom die plate 10, further downward urging of the base member 142 results in a lifting of the pins 147 off of the shoulders 145 against the strength of the springs 150. This arrangement provides for a resilient clamping of the film sheet portion surrounding the finished packages against the surface of the bottom die plate 10. To aid this fixed clamping of the marginal film portions against the bottom die plate 10, the engaging surface of the frame member 143 is provided with a peripheral gasket 151. The frame member 143 as shown in FIG. 18 is further provided with an outwardly projecting portion 152 which carries a downwardly projecting alignment pin 153 which is received in the pin recess 45 of a bottom die plate 10. Upon the operative mating of package removal dies 28 and bottom die plates 10, the pin 153 becomes engaged with the bottom die plates to insure aligned entrance of the knife 164 into the bottom die plate recess 141. A pair of pins 153 may be used to also provide a drive connection if desired.

Received within the frame member 143 is a knife means mounting plate 154 which has fixed thereto a plurality of vertically directed rods 155. As best shown in the right-hand portion of FIG. 15, the rods 155 extend upwardly in rod housings 156 formed in the base plate member 142 and project outwardly thereof above the same through central openings 157. A compressed coil spring 158 surrounds each rod 155 in its housing 156 and is seated at its bottom end against the base of the rod 155 and at its upper end against a shoulder portion 160 defined by the opening 157. The several springs 158 function to continually urge the knife plate 154 downwardly toward cutting position. A collar member 161 is slideably mounted on each rod outwardly of the opening 157 to abut the outer top surface of the rod housing 156 when the rod 155 travels downwardly in response to the urging of the spring 158. A spring seat means 162 is fixed to the topmost end of the rod 155 and retains an upper end of a coil spring 163 between the same and the collar member 161. Upon downward movement of the knife assembly including the plate 154 in a manner to be described, the collar member 161 abuts the outer top surface of the rod housing 156 and the spring 163 is compressed by sliding movement of the member 161 toward the spring seat means 162. This particular arrangement provides a cushioning effect when the knife assembly is operated.

The plate 154 has suitably attached thereto a flexible band knife means 164 which extends about the periphery of each cavity 40 of a bottom die plate 10 with the cutting edge thereof being receivable in the cutting grooves 141 previously described and as shown in FIG. 17. A portion of the band-like knife blade 164 is shown in FIG. 21. It will be seen that the cutting edge thereof is provided with a plurality of sawtooth beveled edge surfaces 165 and behind the cutting edge the band is provided with apertures 166 through which fasteners may be received to fix the knife band to the supporting plate 154. The plate 154 is provided with peripheral and center lip-like portions 167 which back-up the smooth edge of the knife band 164. Various portions of the knife band 164 are provided with slots 168 which are sufficiently recessed to create tab-like connections between an edge of a package and surrounding film during package removal operations. The tab-like connections will be subsequently described.

Each package removal die 28 is suitably attached to a pair of conveyor chains 30 through ears 170 formed along opposite side margins of the base member 142. The chains 30 pass around paired sprockets 31 as previously described and the base member 142 carries along the outer surface thereof a cam follower roller assembly 171 which engages a cam track edge of a plate 172 suitably mounted between the sprockets 31. The cam track plate 172 is large and extends between spaced shafts of the paired sprockets 31. The plate inwardly of the outer cam track periphery thereof is provided with a groove-like cam track recess 173 on both sides thereof. Pairs of knife plate actuating rods 155 of the type illustrated in FIG. 15 are positioned on opposite sides of the cam track plate 172 with the structural arrangement being identical in each instance.

Also on opposite sides of the cam track plate 172 is a vertically directed control rod 174 which is fixed at its bottom end to the knife plate 154. The control rod 174 extends upwardly through a suitable opening 175 in the base plate 142 and at the top end thereof is provided with a cam follower roller assembly 176 which is in engagement with the bottom surface of the recessed cam track 173 as viewed in FIG. 15. With the springs 158 continuously urging the knife plate 154 downwardly, the roller 176 functions as the sole restraint in holding the knife plate 154 in its retracted position within the frame member 143 as shown in broken lines at the left of FIG. 15.

The recessed cam track 173 is provided with an interrupted portion defined by a sharp drop-off surface 177 at a point in the cooperative movement of the combined package removal dies and bottom die plates where package separation is desired. The roller 176 entering into the interrupted cam track area drops downwardly in snap-action manner in response to the strong urging of the coil springs 158. The roller 176 is preferably stopped short of the lower end of a pivotally mounted bridging member 178 which presents an inclined cam track surface 180 along which the roller 176 climbs to retain its original cam track level and retract the knife band 164 back into the frame member 143. A nylon washer 179 received about the control rod 174 prevents the roller 176 from striking the lower end of the bridging member 178 to avoid damage. As previously described, total downward movement of the knife plate 154 will also be dampened by compression of the cushioning springs 163 between the sliding collar 161 and the fixed spring seat means 162 on each rod 155.

The bridging member 178 is pivotally mounted by a pin 181 attached to the cam track plate 172. A rod 182 is attached by a pin 183 to the bridging member 178 near the center thereof to raise and lower the same upon vertical operation of the rod 182. In the raised position of the bridging member 178 the cam track surface 180 thereof will form a continuation of the camming surface of the groove 173 and prevent knife operation.

The rod 182 extends upwardly through a support housing 184 and is slideable therein as illustrated in FIG. 16. The rod 182 is provided with a slot 185 which extends above the top surface of the support housing 184. A roller 186 is suitably mounted in the top portion of the slot 185 and is in engagement with a camming surface 187 of a slideable, plate-like operating arm 188 which along its bottom surface slides across the top surface of the support housing 184. The rod 182 at the top thereof is provided with a rod portion 190 of smaller diameter about which a coil spring 191 is mounted. Suitable means not shown cooperatively function with the coil spring 191 to constantly urge the rod 182 downwardly to maintain the bridging member 178 in its lowered position as shown in FIG. 15.

The locking arm 188 is provided with an inclined cam track surface portion 192 which joins the horizontal surface portion 187 and provides a surface by which the roller 186 and rod 182 attached thereto is raised when the arm 188 is forced through the slot 185 in the rod 182 in the direction of the arrow in FIG. 16. In this manner the rod 182 may be raised with the bridging member 178 pivoting upwardly to close off the interrupted area of the recessed cam track 173. The top surface of the inclined cam track portion 192 of the locking arm 188 joins a flat cam track surface portion 193 which when engaging the roller 186 will hold the rod 182 and bridging member 178 in their upward positions against the spring 191.

FIG. 22 illustrates a preferred form of package separation from the waste combined film sheets as distinguished from the general schematic arrangement illustrated in FIG. 1B. By reason of the slot-like recesses 168 formed in the knife bands 164 in the package removal dies 28 previously described, each package 34 is substantially separated from its surrounding film with the exception of small tear tab areas 194. The tab areas 194 are sufficient merely to provide for adequate retention between the waste film and the packages so that upon separation of the waste film from the bottom die plates 10, the packages 34 will also readily separate from the die plates and be lifted out of the die cavities 40. The waste film material following separation of the package removal dies 28 and bottom die plates 10 is drawn upwardly across a roller assembly 195 and at least partially reversed in its direction toward the waste accumulation roller 33 shown in FIG. 1B. The roller assembly 195 includes opposite end frame members 196 the furthermost as viewed in FIG. 22 being suitably supported on a frame member of the machine not shown. A main support rod 197 extends through the spaced frame members 196 which in turn mount therebetween a plurality of rollers 200 including an outer endmost roller 201 about which the waste film moves. The diameter of any roller contacting the waste film is such that a rather sharp arcuate path is defined for the waste film. Thus when the film traverses the sharp arcuate path the top surface of each package projecting upwardly out of the plane of the waste film is engaged by the roller 201 or rollers 200 and forced downwardly to an extent that the tabs 194 are broken.

Upon complete separation of each package 34 from the surrounding waste film, the package is directly over the conveyor 35 previously generally described in FIG. 1B. This conveyor operates to carry the packages 34 to a shipping station where they are ready for boxing and shipment. The roller assembly 195 may be positioned for package contact with a plurality of rollers 200 if desired depending on the particular operating conditions. A line of demarcation between the combined films 13 and 16 is illustrated in FIG. 22 solely for the purpose of identifying the waste film portions, it being understood that with complete fusing of the supercooled polyvinylidene chloride films, no demarcation is noticeable. Further, the tear tabs 194 are exaggerated in size in FIG. 22 to better illustrate the same.

FIGS. 23–29 deal with modified forms of cooperating top and bottom die plates adapted for use in the same manner as described above in connection with the top and bottom die plates 20 and 10. A modified bottom die plate 202 as shown particularly in FIGS. 23 and 24 is formed from a suitably interconnected base plate 203, gasket 204 and cavity plate 205. The cavity plate 205 includes a pair of cavities 206 in which packages are formed and which are peripherally surrounded by a package removal knife receiving groove 207. The cavities 206 have in communication therewith a plurality of vacuumization passages 208 in the corners and center thereof for the downward drawing of a bottom sheet of supercooled film in the same manner as previously described. Extending along one marginal portion of the paired cavities 206 and across the face of the cavity plate 205 is a film gripping band 210 suitably mounted in a groove in the face of a cavity plate 205 and provided with pairs of saw teeth 211 spaced therealong. This band functions in the same manner as described above in connection with the band 41 of the bottom die plates 10.

Referring particularly to FIG. 26, the base plate 203 has mounted therein a relief valve assembly 212 provided with a cam actuated operating lever 213. This assembly performs the same function as the relief valve unit 48 previously described but is mounted along the bottom of each bottom die plate 202 for operation by a cam track (not shown) which would be mounted centrally along the path of movement of the series of bottom die plates. Along one side margin of the base plate 203 is formed a chain attachment ear 214 and a pair of cam follower assemblies 215. Along the opposite side margin of the base plate 203 is a package forming die insert assembly 216 which is a part of the base plate 203. This assembly includes a depending portion which is provided with spaced cam followers 217 and a chain attachment aperture 218 for cooperation with the ear member 214 in attaching the bottom die plate to a pair of chains for conveyance thereof.

FIGS. 23–26 illustrate the projecting of the die insert assembly 216 upwardly above the top surface of the cavity plate 205. The assembly includes a vertically directed bore 220 which centrally thereof along the outer side of the assembly 216 is cut away to define an outwardly opening groove-like recess 221. A rack-type rod member 222 is received in the bore 220 and is dimensioned to be freely vertically movable therein. One surface portion of the rod member 222 is recessed to define an outwardly opening groove portion 223 which is at least co-extensive with the grooved area 221. A roller type cam follower 224 is suitably mounted to the rod member 222 in the groove 223 and projects outwardly into the groove 221 of the assembly 216. An inner top surface portion of the rod member 222 is provided with a series of gear teeth 225 which are operatively engaged with a gear member 226 extending transversely through the assembly 216 in a bore 227 located near the top of the assembly 216.

As best shown in FIGS. 23, 24 and 26, opposite ends of the gear member 226 project outwardly of the assembly 216 and have attached thereto finger-like die forming means inserts 228. Each insert 228 is dimensioned to project inwardly over the adjacent top surface portion of the cavity plate 205 into association with an edge portion of a cavity 206. These inserts are quite similar to the projecting insert portions 95 of the forks 82 previously described as they are completely clad along their outer end portions by rubber or rubber-like material 230 with only their outer end vertical surfaces 231 exposed. Each insert includes three vertically directed passages 232 which open upwardly through the cladding 230 but not extending through the bottom of the cladding as particularly shown in FIG. 25. Communicating with each vertical passage 232 is a horizontal passage 233 which opens on the vertical exposed face 231 of the insert.

As best shown in FIG. 27 the base of each insert 228 is formed with a split collar portion 234 for mounting on the ends of the gear 226. Locking screws 235 (FIGS. 24 and 26) fixedly clamp the inserts on the gear 226 to provide for pivotal movement of the inserts 228 into and out of a raised position shown in FIG. 23, and also shown in FIG. 25 in broken lines, and into and out of an inwardly directed flat or horizontal position shown in FIGS. 24 and 25. The positioning of the inserts 228 is controlled by a pair of cam track members 236 and 237 shown in broken lines in FIGS. 23 and 24, it being understood that these cam tracks are a fixed part of the package forming machine. During movement of a bottom die plate 202 toward the bottom die plate vacummization station 14, the inserts 228 are maintained in their raised inoperative positions by engagement of the cam follower 224 with the bottom surface of the cam track 236. Referring particularly to FIG. 25, the lowering of the cam follower 224 into the broken line position illustrated results in downward movement of the rod member 222 accompanied by rotation of the gear 226 and a raising of the inserts 228. With the inserts being raised, the top surface of the bottom die plate 202 is completely free to receive thereon the bottom film 13 in covering relation with the cavities 206. Immediately following the overlying of the film 13, the cam follower 224 leaves the track 236 and engages an inclined track portion 238 of the raised track 237. Thus the cam follower then moves upwardly onto the top surface of the track 237 as shown in FIGS. 24 and 25 and the rod member 222 is raised accompanied by rotation of the gear 226 with downward pivoting of the inserts 228 into overlying film engagement.

The insert assembly 216 is further provided with a vertically directed passage 240 which opens at the top surface of the assembly with the opening being surrounded by a compressible sealing gasket 241. The passage extends vertically downwardly below the top surface of the base plate 203 and is joined there with a transversely inwardly directed passage (not shown) which in turn communicates with the top surface of the base plate 203 and the gasket 204 in a manner to be described. The gasket 204 as best shown in FIG. 27 completely peripherally seals the space defined thereby between the base plate 203 and the cavity plate 205. Suitable fastener openings 242 are formed in the gasket to receive therethrough fasteners 243 (FIG. 26) which extend through the base plate 203 and into the cavity plate 205 to connect the assembly. The gasket centrally thereof is provided with an opening 244 which receives therethrough a plate centering and locking stud 245 integrally formed on the bottom surface of the cavity plate 205 and projecting therefrom. The stud 245 is provided with a tapped opening 246 which receives a fastener 247 (FIG. 26) directed from the bottom of the back plate 203. This back plate further includes a stud housing 248 which receives the stud 245 therein. In this manner the plates are properly aligned during assembly and the central portion of the assembly is fixedly clamped.

The gasket 204 is further provided with a plurality of interconnected vacuumization areas 250 defined by cut-out portions. These areas underlie the passages 208 which communicate with the die cavities 206. The gasket 204 is also provided with a narrow cut-out vacuumization area 251 which is in communication with the areas 250 and which is located for communication with the combined passages in the base plate 203 previously described and connected to the opening 240 in the insert assembly 216.

Following combining of the bottom film 13 with the bottom die plate 202 and the lowering of the inserts 228 into operative position, bottom die plate vacuumization equipment similar in operation to that previously described at the station 14 operates with the bottom die plate 202 to evacuate the same and draw the film downwardly into the cavities 206. The nozzle member 76 of the vacuumization assembly engages the gasket 241 at the top end of the opening 240 and is sealed to the opening 240 to evacuate air from the bottom die plate therethrough. Air is evacuated through the interconnected passages extending through the base plate 203 and in communication with the narrow slot 251 in the gasket 204. It will be readily seen that evacuation occurs in the slotted areas 250 and through the passages 208 to draw the film downwardly into the cavities 206. The slotting of the gasket 204 in the manner described provides for immediate vacuumization response and substantial efficiency in operation. The gasket 204 is also adapted for use in the top die plate assembly to be described and for such use is further provided with spaced drive pin receiving openings 252 and a cut-out vacuumization area 253. These particular parts of the gasket 204 do not perform any function in the bottom die plate assembly.

The modified top die plate assembly 254 as best shown in FIGS. 28 and 29 is formed from a base plate 255, a gasket 204 of the type previously described, and a cavity plate 256. The cavity plate 256 is formed with a pair of cavities 257 which have corner and center vacuumization passages 258 in communication therewith. Side marginal portions of the cavities 257 and the adjacent plate surface are grooved out to form recesses 260 in which the die inserts 228 are received. The resilient gasket cladding 230 of the inserts 228 is pressed against the surface of the grooved areas 260 to completely seal the package forming die in its closed position. The cavities 257 are further peripherally sealed by gaskets 261 which are suitably mounted in grooves formed in the cavity plate 256. Drive pin receiving openings 262 are formed on opposite sides of the cavity plate 256 to receive upwardly projecting drive pins 263 mounted on the cavity plate 205 of the bottom die plate assembly 202 (FIGS. 23 and 24). The cavity plate 256 is further provided with three passages 264 extending vertically therethrough and in communication with the insert receiving grooved areas 260. These passages are arranged for alignment with the passages 232 of the inserts 228 and for peripheral sealing by the raised cladding 230 of the inserts.

The gasket 204 is also used in the top die plate assembly 254 and as shown in FIG. 29 is arranged between the plates 255 and 256 to receive fasteners (not shown) through the openings 242 to connect the top die plate assembly. The cavity plate 256 of the assembly also includes a rearwardly projecting centering and locking stud centrally thereof which is of the same type as the stud 245 previously described, this stud extending through the gasket opening 244 into attached relation with the back plate 255. The vacuumization areas 250 are arranged to communicate with the passages 258 of the cavities 257 to hold the film from collapse about the product during flushing of the package area between the films 13 and 16 as previously described. The back plate 255 has attached thereto fittings 265 and 266 which attach the tubing 24 and 25 thereto. As shown in FIG. 29, the fitting 266 is in communication with an internal passage 267 which extends transversely inwardly of the back plate 255 and in turn communicates with vertical passages 268 and 270. The passage 268 is exposed along a laterally projecting surface portion of the back plate 255 beyond the adjacent edge of the gasket 204 and cavity plate 256. The passage 268 is arranged for communication with the passage 240 of the bottom die plate assembly when the plates are combined for package forming operations. The passage 270 communicates with the vacuumization slot 251 of the gasket 204 which in turn is in communication with the slot areas 250 and the passages 258 of the die cavities 257.

The fitting 265 is in communication with an internal passage 271 extending into the back plate 255 which in turn is in communication with a vertical passage 272 which opens on the face of the back plate 255 and is in communication with the gasket slot 253. Upon assembly of the top die plate 254, the gasket slot 253 becomes aligned over the passages 264 of the cavity plate 256. Thus the passage 272 is placed in communication with the passages 264 as well as the die insert passages when the complete package forming die is assembled for packaging operation. The operation is similar as previously described in that a vacuum is drawn through the tubing 25 by operation of the rotary valve assembly 23 and the passages 267, 268, 270 and 240 are evacuated. This provides for evacuation of the slot areas 250 and 251 of the gaskets 204 of both the top and bottom die plates. Thus the top and bottom films received in the die cavities 257 and 206 are held from combining with one another by vacuum drawn on their outer surfaces through the passages of the die cavities. While the films are thus held, the interior of the package may be swept or flushed with an inert gas through the tubing 24 and associated passages leading through the die inserts 228. When these operations are completed, the tubing 25 and associated passages will be open to the atmosphere to release the films and a vacuum is drawn through the tubing 24 and associated passages to bring the film together about the product and complete the package.

The relief valve assembly 212 of the bottom die plate assembly communicates with the slot area 251 of the gasket 204 of this assembly and the passages extending from the passage 240 of the assembly 216. This assembly operates in the same manner as previously described in connection with the valve unit 48.

In all basic respects the modified die plates will be used in the same manner as previously described in conjunction with the operation of the machine involving the die plates 10 and 20. The pivotal mounting of the die plate inserts 228 on the modified bottom die plate 202 eliminates the necessity of having a separate series of forks 82 which are timed for coinciding operation with the die plates. The cavity plate 205 of the bottom die plate 202 carries the finished packages still attached to surrounding continuous film through the package removal station 27 and the package cut-out dies 28 function in the same manner as previously described with the knife means thereof being received in the peripheral recesses 207. Following package separation and during lifting of the waste film from the bottom die plate 202, the inserts 228 may be raised to an inoperative position by cam operation and readily separated from the marginal portions of the film. While operation of the apparatus has been described in connection with the use of supercooled polyvinylidene chloride film, it will be understood that the apparatus is capable of use with other films exhibiting sufficiently similar properties.

Obviously certain modifications and variations of the invention as hereinbefore set forth may be made without departing from the spirit and scope thereof, and therefore only such limitations should be imposed as are indicated in the appended claims.

We claim:

1. Package forming apparatus for use with polyvinylidene chloride film in its supercooled state, said apparatus comprising die forming means including cooperating die plates and conveyor means for moving said plates into and out of temporary package forming association, at least one of said die plates having a product receiving die cavity portion, means for delivering a first film to said one die plate in covering relation with said cavity portion, first die plate vacuumization means operable relative to said one die plate to peripherally seal said first film to said plate and draw said film centrally into said cavity portion, means mounting and operating said first die plate vacuumization means relative to said one die plate and the conveyor means therefor for reciprocation into and out of operative engagement with said one die plate, further means for delivering a second film to the other of said die plates for use thereby in forming a product enclosing package when said die plates are moved into package forming association, and second die plate vacuumization means operable with each of said die plates during package forming association thereof to draw the portions of the films enclosed by said plates into product enclosing sealed relation.

2. Package forming apparatus for use with polyvinylidene chloride film in its supercooled state, said apparatus comprising die forming means including cooperating die plates and conveyor means from moving said plates into and out of temporary package forming association, at least one of said die plates having a product receiving die cavity portion, means for delivering a first film to said one die plate in covering relation with said cavity portion, first die plate vacuumization means operable relative to said one die plate to peripherally seal said first film to said plate and draw said film centrally into said cavity portion, means mounting and operating said first die plate vacuumization means relative to said one die plate and the conveyor means therefor for reciprocation into and out of operative engagement with said one die plate, further means for delivering a second film to the other of said die plates for use thereby in forming a product enclosing package when said die plates are moved into package forming association, second die plate vacuumization means operable with each of said die plates during package forming association thereof to draw the portions of the films enclosed by said plates into product enclosing sealed relation, and package removal means operative with said one die plate to separate formed packages from the film originally enclosed by said plates.

3. The package forming apparatus of claim 2 wherein said package removal means includes a package cut-out die means movable into temporary operative association with said one die plate subsequent to package formation in the cavity portion thereof, said package cut-out die means comprising knife means peripherally operative with said cavity portion to surround a package therein and at least substantially separate the same from surrounding film, said knife means being movable into and out of cutting position and urged toward cutting position by resilient means, and cam actuated holding means maintaining said knife means in inoperative position against the urging of said resilient means, said holding means including a cam track which is interrupted to provide for controlled actuation of said knife means.

4. The package forming apparatus of claim 2 wherein said package removal means includes a package cut-out die means movable into temporary operative association with said one die plate subsequent to package formation in the cavity portion thereof, said package cut-out die means comprising knife means peripherally operative with said cavity portion to surround a package therein and at least substantially separate the same from surrounding film, said knife means being movable into and out of cutting position and urged toward cutting position by resilient means, cam actuated holding means maintaining said knife means in inoperative position against the urging of said resilient means, said holding means including a cam track which is interrupted to provide for controlled actuation of said knife means, and film guide and collection means receiving waste film from said one die plate and including package ejection means which completes package separation from surrounding film following cutting thereof by said knife means.

5. Package forming apparatus for use with polyvinylidene chloride film in its supercooled state, said apparatus comprising die forming means including cooperating die plates and conveyor means for moving said plates into and out of temporary package forming association, at least one of said die plates having a product receiving die cavity portion, means for delivering a first film to said one die plate in covering relation with said cavity portion, first die plate vacuumization means operable with said one die plate to seal said first film peripherally to said one die plate and draw said film centrally into said cavity portion, said first die plate vacuumization means being in the form of a resilient frame for peripheral engagement and sealing of said first film to said one die plate and including nozzle-type vacuum impressing means for coaction with passages formed internally of said one die plate and in communication with said cavity portion, means for reciprocating said first die plate vacuumization means into and out of operative association with a plurality of successive die plates, further means for delivering a second film to the other of said die plates for use thereby in forming a product enclosing package when said die plates are moved into package forming association, and second die plate vacuumization means operable with each of said die plates during package forming association thereof to draw the portions of the films enclosed by said plates into product enclosing sealed relation.

6. The package forming apparatus of claim 5 wherein at least one of said die plates includes a projecting film attaching means on the film receiving surface thereof.

7. Package forming apparatus for use with polyvinylidene chloride film in its supercooled state, said apparatus comprising die forming means including cooperating pairs of package forming die plates and conveyor means for moving said plates into and out temporary package forming association, at least one of said die plates having a product receiving die cavity portion and internal passages in communication therewith, means for delivering a first film to said one die plate in covering relation with said cavity portion, first die plate vacuumization means operable with said one die plate and the internal passages thereof to draw said film centrally into said cavity portion, further means for delivering a second film to the other of said die plates for use thereby in forming a product enclosing package when said die plates are moved into package forming association, said other die plate including internal passages in communication with said second film, and second die plate vacuumization means operable with each of said die plates during package forming association thereof to draw the portions of the films enclosed by said plates into product enclosing sealed relation, said second die plate vacuumization means comprising a die forming means insert receivable between cooperating die plates along peripheral portions thereof during package forming association thereof, said insert including passages therein which become aligned with said internal passages of said die plates for vacuum impressing during package forming, and vacuum impressing control means connected to said die plates and the internal passages thereof for controlled package forming during package forming association of said die plates.

8. The package forming apparatus of claim 7 wherein said die forming means insert is carried by separate conveyor means timed to the operational movement of said die plates to be received therebetween just prior to die forming association of said die plates.

9. The package forming apparatus of claim 7 wherein said die forming means insert is pivotally mounted on said one die plate along an edge portion thereof for positioning out of association with the film receiving surface of said plate prior and subsequent to package forming, and insert positioning camming means forming a part of said package forming apparatus and operative with said insert to control the positioning thereof.

10. Package forming apparatus for use with polyvinylidene chloride film in its supercooled state, said apparatus comprising die forming means including cooperating die plates and conveyor means for moving said plates into and out of temporary package forming association, at least one of said die plates having a product receiving die cavity portion, means for delivering a first film to said one die plate in covering relation with said cavity portion, first die plate vacuumization means operable with said one die plate to seal said first film peripherally to said one die plate and draw said film centrally into said cavity portion, said first die plate vacuumization means being in the form of a resilient frame for peripheral engagement and sealing of said first film to said one die plate and including nozzle-type vacuum impressing means for co-action with passages formed internally of said one die plate and in communication with said cavity portion, means for reciprocating said first die plate vacuumization means into and out of operative association with a plurality of successive die plates, further means for delivering a second film to the other of said die plates for use thereby in forming a product enclosing package when said die plates are moved into package forming association, second die plate vacuumization means operable with each of said die plates during package forming association thereof to draw the portions of the films enclosed by said plates into product enclosing sealed relation, said second die plate vacuumization means comprising a die forming means insert receivable between cooperating die plates along peripheral portions thereof during package forming association thereof, said insert including passages therein which become aligned with passages formed internally of said die plates for vacuum impressing during package forming, vacuum impressing control means connected to said die plates and the internal passages thereof for controlled package forming during package forming association of said die plates, and package removal means operative with said one die plate to separate formed packages from the film originally enclosed by said plates.

11. The package forming apparatus of claim 10 wherein at least one of said die plates includes a projecting film attaching means on the film receiving surface thereof.

12. The package forming apparatus of claim 10 wherein said die forming means insert is carried by separate conveyor means timed to the operational movement of said die plates to be received therebetween just prior to die forming association of said die plates.

13. The package forming apparatus of claim 10 wherein said die forming means insert is pivotally mounted on said one die plate along an edge portion thereof for positioning out of association with the film receiving surface of said plate prior and subsequent to package forming, and insert positioning camming means forming a part of said package forming apparatus and operative with said insert to control the positioning thereof.

14. The package forming apparatus of claim 10 wherein said package removal means includes a package cut-out die means movable into temporary operative association with said one die plate subsequent to package formation in the cavity portion thereof, said package cut-out die means comprising knife means peripherally operative with said cavity portion to surround a package therein and at least substantially separate the same from surrounding film, said knife means being movable into and out of cutting position and urged toward cutting position by resilient means, and cam actuated holding means maintaining said knife means in inoperative position against the urging of said resilient means, said holding means including a cam track which is interrupted to provide for controlled actuation of said knife means.

15. The package forming apparatus of claim 10 wherein said package removal means includes a package cut-out die means movable into temporary operative association with said one die plate subsequent to package formation in the cavity portion thereof, said package cut-out die means comprising knife means peripherally operative with said cavity portion to surround a package therein and at least substantially separate the same from surrounding film, said knife means being movable into and out of cutting position and urged toward cutting position by resilient means, cam actuated holding means maintaining said knife means in inoperative position against the urging of said resilient means, said holding means including a cam track which is interrupted to provide for controlled actuation of said knife means, and film guide and collection means receiving waste film from said one die plate and including package ejection means which completes package separation from surrounding film following cutting thereof by said knife means.

16. In combination, a first conveyor having mounted thereon a plurality of successive bottom die plates, a second conveyor having mounted thereon a plurality of successive top die plates, said die plates being arranged to cooperatively temporarily combine and form a series of continuously moving package forming dies, means for delivering a continuous sheet-like first film of supercooled polyvinylidene chloride to said bottom die plates prior to combining thereof with said top die plates and a continuous sheet like second film of supercooled polyvinylidene chloride to said top die plates, at least said bottom die plates each being provided with a package shaping and product receiving cavity portion over which said first film is received, said die plates having internal passages for controlled vacuumization of said package forming dies formed thereby, and bottom die plate vacuumization means operable relative to each successive bottom die plate prior to combining thereof with a top die plate to peripherally seal said first film about a cavity portion and draw said film centrally into said cavity portion, said bottom die plate vacuumization means being mounted relative to said bottom die plates for reciprocation into and out of operative engagement with successive bottom die plates.

17. The combination of claim 16 wherein at least one of said die plates includes an upstanding film engaging means formed with film puncturing projections to hold the film during package forming.

18. In combination, a first conveyor having mounted thereon a plurality of successive bottom die plates, a second conveyor having mounted thereon a plurality of successive top die plates, said die plates being arranged to cooperatively temporarily combine and form a series of continuously moving package forming dies, means for delivering a continuous sheet-like first film of supercooled polyvinylidene chloride to said bottom die plates prior to combining thereof with said top die plates and a continuous sheet-like second film of supercooled polyvinylidene chloride to said top die plates, at least said bottom die plates each being provided with a package shaping and product receiving cavity portion over which said first film is received, said die plates having internal passages for controlled vacuumization of said package forming dies formed thereby, and bottom die plate vacuumization means operable with each successive bottom die plate prior to combining thereof with a top die plate to peripherally seal said first film about a cavity portion and draw said film centrally into said cavity portion, said bottom die plate vacuumization means being in the form of a reciprocating frame having a resilient base dimensioned to surround said cavity portion and seal said film peripherally thereabout, nozzle means carried by said frame and adapted for sealed alignment with an opening in the plate in communication with the internal passages thereof, vacuum impressing means connected to said nozzle means, and means for reciprocating said frame.

19. In combination, a first conveyor having mounted thereon a plurality of successive bottom die plates, a second conveyor having mounted a plurality of successive top die plates, said die plates being arranged to cooperatively temporarily combine and form a series of continuously moving package forming dies, means for delivering a continuous sheet-like first film of supercooled polyvinylidene chloride to said bottom die plates prior to combining thereof with said top die plates and a continuous sheet-like second film of supercooled polyvinylidene chloride to said top die plates, at least said bottom die plates each being provided with a package shaping and product receiving cavity portion over which said first film is received, said die plates having internal passages for controlled vacuumization of said package forming dies formed thereby, and die and package vacuumization means cooperating with the passages of said die plates following combining of said plates, said vacuumization means comprising a die insert receivable between said plates and including internal passages which interconnect the passages of said die plates and at least some of which are in communication with the die cavity portion between said first and second films, each die insert being pivotally mounted on an edge portion of a bottom die plate and movable from a vertically inoperative position into a horizontal operative position overlying said bottom die plate to be enclosed between the same and a top die plate, and camming means operative with each die insert to maintain the same in said vertical position during film delivery to said bottom die plates and thereafter move the same into said horizontal position.

20. Package removal means for use with package forming apparatus of the type described wherein a series of spaced packages are formed in continuous sheets of combined films and the packages are supported by a series of continuously moving bottom die plates, said package removal means comprising conveyor means mounting a series of successive package cut-out die means for cooperative combination with bottom die plates, each of said cut-out die means including a frame-like portion to be received about a package and clamp surrounding film to a bottom die plate, knife means in said frame-like portion and being movable into and out of said frame-like portion for film cutting purposes, resilient means urging said knife means into cutting position, cam actuated means acting against said resilient means to hold said knife means out of cutting position, and cam track means engaging cam means forming a part of said cam actuated means to maintain said knife means out of cutting position, said cam track means including an interrupted portion which is defined by a pivotally mounted bridging member adapted to bridge said interrupted portion to prevent operation of said knife means in one position and in another position provide an inclined cam track for the return of said knife means from an operative position to an inoperative position.

21. The package removal means of claim 20 wherein said knife means are interrupted to provide tear tab areas which maintain weakened interconnections between a package and surrounding film to aid in separating the packages and film from the bottom die plates, said package removal means further including waste film collection means which draws said film from the bottom die plates in an arcuate path over a roller assembly, the change of direction of said film over said roller assembly being sufficient to cause said assembly to force each package outwardly from the surrounding film to overcome the connecting strength of said tear tabs and separate each package from said film.

22. In combination, a first conveyor having mounted thereon a plurality of successive bottom die plates, a second conveyor having mounted thereon a plurality of successive die plates, said die plates being arranged to cooperatively temporarily combine and form a series of continuously moving package forming dies, means for delivering a continuous sheet-like first film of supercooled polyvinylidene chloride to said bottom die plates prior to combining thereof with said top die plates and a continuous sheet-like second film of supercooled polyvinylidene chloride to said top die plates, at least said bottom die plates each being provided with a package shaping and product receiving cavity portion over which said first film is received, said die plates having internal passages for controlled vacuumization of said package forming dies formed thereby, vacuum impressing means connected to at least one series of die plates for temporary communication with said internal passages during combining of said die plates, and conveyor drive means connected to one of said conveyors, said die plates including mating drive means to transmit driving power to the other of said conveyors as a result of temporary combining of said die plates.

23. The combination of claim 22 wherein the mating drive means of said die plates are in the form of drive pins carried by each plate of one series and pin receiving recesses carried by each plate of the other series.

24. A package forming die assembly for use with supercooled polyvinylidene chloride film to form a package therefrom, said die assembly comprising cooperating die plates having engaging surfaces at least one of which is recessed to define a package shaping and product receiving cavity, resilient sealing means carried by at least one of said surfaces in surrounding relation with said cavity while being interrupted along an edge portion of said cavity to receive therethrough a transversely directed die assembly insert, said insert including resilient sealing means which in cooperation with said first named sealing means completely seals off said cavity, at least one of said die plates including internal passages which are in communication with internal passages in said insert, at least some of the passages of said insert further being in communication with said cavity, and vacuum impressing and control means connected to said assembly and in communication with said passages.

25. The package forming die assembly of claim 24 wherein said insert is pivotally mounted on a die plate for movement into and out of operative transversely directed position.

26. The package forming die assembly of claim 24 wherein each die plate which is formed with a cavity is provided with a transverse slot-like area internally thereof underlying said cavity, the passages of said plate extending from said cavity to said area and from said area to said insert, and gasket means in said area sub-dividing the same into passage interconnection channels to provide for controlled air and gas movement through said plate.

27. The package forming die assembly of claim 24 wherein said die plates include interlocking drive means which upon die plate surface engagement become cooperatively engaged for unitary operational movement of said assembly.

28. The package forming die assembly of claim 24 wherein at least one die plate on the engaging surface thereof carries a projecting film piercing means adapted to engage a film overlying said die plate to maintain the position thereof on said plate.

29. The package forming die assembly of claim 24 wherein at least one die plate is provided with a plurality of package shaping and product receiving cavities, said assembly including an insert for each cavity.

30. The package forming die assembly of claim 24 wherein said insert is in the form of an arm-like member mounted on a shaft journaled in a housing forming a part of a die plate, and vertically operable means engaged with said shaft to reversely rotate the same to move said insert into and out of operative transversely inwardly directed plate surface overlying position, said vertically operable means including a cam adapted for engagement with a cam track of changing direction.

31. A package forming die assembly for use with supercooled polyvinylidene chloride film to form a package therefrom, said die assembly comprising cooperating top and bottom die plates having engaging surfaces at least one of which is recessed to define a package shaping and product receiving cavity, resilient sealing means carried by at least one of said surfaces in surrounding relation with said cavity while being interrupted along an edge portion of said cavity to receive therethrough a transversely directed die assembly insert, said insert including resilient sealing means which in cooperation with said first named sealing means completely peripherally seals off said cavity, each of said die plates including internal passages which are in communication with internal passages in said insert with said insert comprising means whereby the passages of each die plate are interconnected, at least some of the passages of said insert further being in communication with said cavity, and vacuum impressing and control means connected to at least one of said plates and in communication with said passages.

32. A package forming die assembly for use with supercooled polyvinylidene chloride film to form a package therefrom, said die assembly comprising cooperating die plates having engaging surfaces at least one of which is recessed to define a package shaping and product receiving cavity, resilient sealing means carried by at least one of said surfaces in surrounding relation with said cavity while being interrupted along an edge portion of said cavity to receive therethrough a transversely directed die assembly insert, said insert including resilient sealing means which in cooperation with said first named sealing means completely seals off said cavity, at least one of said die plates including internal passages which are in communication with internal passages in said insert, at least some of the passages of said insert further being in communication with said cavity, vacuum impressing and control means connected to said assembly and in communication with said passages, and valve means carried by at least one of said plates and in communication with said passages to open the same to atmospheric pressure upon opening of said valve means.

33. A package forming die assembly comprising cooperating die plates having engaging surfaces at least one of which is recessed to define a package shaping and product receiving cavity, a transversely directed die assembly insert received between the mating surfaces of said die plates and in communication with said cavity, said insert cooperating with said mating surfaces to seal off said cavity, at least one of said die plates including internal passages which are in communication with internal passages in said insert, at least some of the passages of said insert further being in communication with said cavity, and vacuum impressing and control means connected to said assembly and in communication with said passages.

34. The package forming die assembly of claim 33 wherein said insert is pivotally mounted on a die plate for movement into and out of operative transversely directed position.

References Cited in the file of this patent

UNITED STATES PATENTS

| | | |
|---|---|---|
| 2,590,379 | Cloud | Mar. 25, 1952 |
| 2,624,164 | Donofrio | Jan. 6, 1953 |
| 2,634,562 | Mueller et al. | Apr. 14, 1953 |
| 2,712,208 | Campbell | July 5, 1955 |
| 2,888,787 | Cloud | June 2, 1959 |
| 2,896,387 | Brock | July 28, 1959 |
| 2,902,808 | Lang | Sept. 8, 1959 |
| 2,927,409 | Heyer | Mar. 8, 1960 |
| 2,934,867 | Vogt | May 3, 1960 |
| 2,935,828 | Mahaffy et al. | May 10, 1960 |
| 2,958,168 | Vogt | Nov. 1, 1960 |
| 2,775,081 | Stirn et al. | Dec. 25, 1956 |
| 3,001,348 | Rado | Sept. 26, 1961 |